United States Patent
Hartung et al.

(10) Patent No.: US 11,019,805 B2
(45) Date of Patent: Jun. 1, 2021

(54) ROBOT ASSISTED SURVEILLANCE OF LIVESTOCK

(71) Applicant: FARM ROBOTICS AND AUTOMATION SL, Vilanova i la Geltru (ES)

(72) Inventors: Jorg Hartung, Gehrden (DE); Heiner Lehr, Vilanova i la Geltru (ES); Daniel Roses Domenech, Barcelona (ES)

(73) Assignee: FARM ROBOTICS AND AUTOMATION SL, Vilanova I la Geltru (ES)

( * ) Notice: Subject to any disclaimer, the term of this patent is extended or adjusted under 35 U.S.C. 154(b) by 0 days.

(21) Appl. No.: 16/318,979

(22) PCT Filed: Jul. 20, 2017

(86) PCT No.: PCT/EP2017/068433
§ 371 (c)(1),
(2) Date: Jan. 18, 2019

(87) PCT Pub. No.: WO2018/015519
PCT Pub. Date: Jan. 25, 2018

(65) Prior Publication Data
US 2019/0307106 A1    Oct. 10, 2019

(30) Foreign Application Priority Data
Jul. 20, 2016   (EP) ..................................... 16180415

(51) Int. Cl.
*A01K 29/00*    (2006.01)
*A01K 1/00*    (2006.01)
*G05D 1/02*    (2020.01)

(52) U.S. Cl.
CPC ................ *A01K 29/00* (2013.01); *A01K 1/00* (2013.01); *G05D 1/0272* (2013.01); *G05D 1/027* (2013.01);
(Continued)

(58) Field of Classification Search
CPC ........ A01K 29/00; A01K 1/00; G05D 1/0272; G05D 1/0234; G05D 1/027; G05D 2201/0201
See application file for complete search history.

(56) References Cited

U.S. PATENT DOCUMENTS

| | | | | |
|---|---|---|---|---|
| 5,016,173 A | * | 5/1991 | Kenet | A61B 5/0059 382/128 |
| 5,056,525 A | * | 10/1991 | Hafezi | A61B 5/015 600/474 |

(Continued)

FOREIGN PATENT DOCUMENTS

| | | |
|---|---|---|
| CN | 101278654 A | 10/2008 |
| CN | 203661767 U | 6/2014 |

(Continued)

OTHER PUBLICATIONS

International Search Report for PCT/EP2017/068433, dated Oct. 19, 2017.

(Continued)

*Primary Examiner* — Nay Tun
(74) *Attorney, Agent, or Firm* — Bacon & Thomas, PLLC

(57) ABSTRACT

A system for monitoring the welfare of livestock in a shed, the system including a plurality of sensors for measuring ambient conditions in the shed; a robot, adapted to move through the shed; a processing engine and a memory operatively associated with the processing engine. The robot includes at least two cameras, one of which is a thermal camera. The processing engine is operatively associated (Continued)

with the robot and the plurality of sensors for receiving data recorded by the robot and the plurality of sensors, the recorded data including measurements of ambient conditions in the shed; and images from the at two cameras.

22 Claims, 18 Drawing Sheets

(52) U.S. Cl.
CPC ... *G05D 1/0234* (2013.01); *G05D 2201/0201* (2013.01)

(56) References Cited

U.S. PATENT DOCUMENTS

| | | | | |
|---|---|---|---|---|
| 5,474,085 | A * | 12/1995 | Hurnik | A01K 11/006 600/587 |
| 5,525,883 | A | 6/1996 | Avitzour | |
| 6,439,162 | B1 * | 8/2002 | van den Berg | A01K 1/0103 119/174 |
| 7,228,815 | B2 * | 6/2007 | Kortekaas | A01J 5/0175 119/14.02 |
| 7,984,529 | B2 * | 7/2011 | Mainini | G05D 1/0246 15/319 |
| 8,098,167 | B2 * | 1/2012 | Geerts | A01K 29/00 340/540 |
| 9,538,728 | B2 * | 1/2017 | Womble | A01K 27/009 |
| 9,948,902 | B1 * | 4/2018 | Trundle | H04N 7/183 |
| 10,189,568 | B2 * | 1/2019 | O'Connor | G05D 1/0088 |
| 10,231,441 | B2 * | 3/2019 | Horton | A01K 5/01 |
| 10,321,663 | B2 * | 6/2019 | Horton | A01K 29/005 |
| 2001/0013828 | A1 | 8/2001 | Geerts | |
| 2001/0046316 | A1 | 11/2001 | Miyano et al. | |
| 2002/0108575 | A1 * | 8/2002 | Van der Lely | A01K 1/12 119/14.1 |
| 2003/0233983 | A1 * | 12/2003 | Kortekaas | A01J 5/0175 119/14.1 |
| 2006/0293810 | A1 | 12/2006 | Nakamoto | |
| 2007/0198129 | A1 * | 8/2007 | Koselka | B25J 5/007 700/245 |
| 2008/0173247 | A1 * | 7/2008 | Mainini | A01K 1/0128 119/161 |
| 2010/0154722 | A1 * | 6/2010 | Van Den Berg | G01B 11/25 119/720 |
| 2012/0307046 | A1 * | 12/2012 | Lundberg | G01J 5/0022 348/135 |
| 2013/0162796 | A1 * | 6/2013 | Bharara | A61B 5/7425 348/77 |
| 2013/0319336 | A1 | 12/2013 | Thompson | |
| 2015/0257355 | A1 * | 9/2015 | Pinsky | A01J 5/003 119/14.01 |
| 2015/0302241 | A1 * | 10/2015 | Eineren | A01J 5/007 382/110 |
| 2015/0327518 | A1 * | 11/2015 | Han | A01K 29/005 348/143 |
| 2015/0342150 | A1 * | 12/2015 | Womble | A01K 27/009 119/718 |
| 2016/0000048 | A1 * | 1/2016 | Dolara | A22B 7/008 119/843 |
| 2017/0086428 | A1 * | 3/2017 | Horton | A01K 29/005 |
| 2017/0202185 | A1 * | 7/2017 | Trumbull | G16H 40/67 |
| 2017/0231186 | A1 * | 8/2017 | Rousseau | A01J 7/02 119/14.08 |
| 2017/0344833 | A1 * | 11/2017 | Ahlberg | G06K 9/00771 |
| 2018/0360002 | A1 * | 12/2018 | Planquette | A01K 31/04 |
| 2019/0080160 | A1 * | 3/2019 | Wee | A61B 5/1171 |
| 2019/0244350 | A1 * | 8/2019 | Miodini | A61B 5/015 |
| 2019/0307106 | A1 * | 10/2019 | Hartung | G05D 1/0272 |

FOREIGN PATENT DOCUMENTS

| | | | | |
|---|---|---|---|---|
| CN | 104616424 | A | | 5/2015 |
| CN | 104621004 | A | | 5/2015 |
| CN | 204839473 | U | | 12/2015 |
| CN | 204929966 | U | | 1/2016 |
| CN | 204976639 | U | | 1/2016 |
| CN | 205265837 | U | * | 5/2016 |
| DE | 102012003987 | A1 | | 8/2013 |
| EP | 3266371 | A1 * | 1/2018 | ............ A61B 5/015 |
| GB | 2513912 | A | | 11/2014 |
| GB | 2534265 | A * | 7/2016 | .......... A01K 29/005 |
| JP | 61028884 | | | 8/1986 |
| JP | 2008103838 | A * | 5/2008 | |
| KR | 20160082619 | A | | 7/2016 |
| WO | 0070941 | A1 | | 11/2000 |
| WO | 0070942 | A1 | | 11/2000 |
| WO | 2016087622 | A1 | | 6/2016 |

OTHER PUBLICATIONS

Written Opinion for PCT/EP2017/068433, dated Oct. 19, 2017.
European Search Report in related EP Application No. 16180415. 8-1655, dated Jan. 26, 2017.
Turner, J., Garces L., Smith W "The Welfare of Broiler Chickens in the European Union," Compassion in World Farming Trust, 2005.
International Preliminary Report on Patentability for PCT/EP2017/ 068433, dated Jan. 22, 2019.
European Office Action in corresponding European Application No. 17749389.7-1011, dated Nov. 21, 2019.
Chinese Office Action in corresponding Chinese Application No. 201780044384.9, dated Feb. 2, 2021.

* cited by examiner

Frontview          Sideview

Empty drinker
Thermal image on the right shows a blue colour

Thermal image of full drinker on the right shows a red colour

ROBOT ASSISTED SURVEILLANCE OF LIVESTOCK

The present invention relates to a robot surveillance system and method suitable for intensive meat production in animals such as poultry, as well as to a robot for use in such a system or method.

BACKGROUND OF THE INVENTION

The market for meat products has been affected by the classification by the International Agency for Research on Cancer (IARC) of the World Health Organization that processed meat is a carcinogen and it has classified red meat as a probable carcinogen. Processed meat includes hot dogs, ham, bacon, sausage, and refers in general to meat that has been treated in some way to preserve or flavour it such as by salting, curing, fermenting, and smoking. Red meat includes beef, pork, lamb, and goat.

Based on these statements there has been a call to limit the sales of red and processed meat. The American Cancer Society Guidelines on Nutrition and Physical Activity for Cancer Prevention recommends choosing fish, poultry, or beans instead of red meat and processed meat. Fresh white meat can be obtained from poultry which includes, chickens (including bantams), turkeys, ducks, geese, partridges, quail, pheasants, pigeons—reared for meat, guinea fowl, ostriches, emus and rheas.

Broiler chickens or "broilers", are a gallinaceous domesticated fowl, bred and raised mainly for meat production. Broilers and egg-laying chickens are subspecies of the red jungle fowl (*Gallus gallus*). Most commercial broilers reach slaughter-weight at between five and seven weeks of age, with some breeds reaching slaughter-weight at 14 weeks of age. Broilers are susceptible to several welfare concerns, particularly skeletal malformation and dysfunction, skin and eye lesions, and congestive heart conditions. Broilers are usually grown as mixed-sex flocks in large sheds under intensive conditions.

Poultry such as broilers offers a white meat of good quality. However, the method of farming can lower the quality of life for the birds and can reduce the quality of the meat. Poultry should be kept from hunger and thirst—animals must have access to fresh water and a diet which will maintain health and vigour. Poultry should be free from discomfort—an appropriate environment should be provided, including shelter and a comfortable resting area.

The animals should be free from pain, injury or disease—prevention of illnesses, or rapid diagnosis and treatment are a necessity. The animals should be allowed to express normal behaviour—sufficient space, proper facilities and company of the animal's own kind should be provided. Conditions and treatment should be provided which avoid mental suffering.

In intensive broiler sheds, the air can become highly polluted with ammonia from the droppings. In this case ventilation must be increased to bring in more clean fresh air. High ammonia levels can damage the broilers' or chickens' eyes and respiratory systems and can cause painful burns on their legs called hock burns and blisters on their feet. Ammonia is generated from wet bird's faeces containing uric acid by enzymatic and bacterial activity. As long as the litter can absorb the humidity bacterial activity is low and consequently ammonia concentrations are low. Wet litter together with release of ammonia enhances deep dermatitis and hock burn. Above 50, e.g. 70 ppm of ammonia conjunctivitis occurs. Hence ammonia concentration in broiler house air depends largely on wet litter, animal density and ventilation rate.

Broilers bred for fast growth have a high rate of leg deformities because the large breast muscles cause distortions of the developing legs and pelvis, and the birds cannot support their increased body weight. In cases where the broilers or chickens become crippled and can't walk farm personnel have to go in and pull out the effective birds and possibly kill them. Most losses tend to be in the first three to seven days or later at the end just before slaughter.

If broilers or chickens in shed can have restricted movement, for example, the broilers or chickens may not able to adjust their environment to avoid heat, cold or dirt as they would in natural conditions. The added weight and overcrowding also puts a strain on their hearts and lungs and Ascites can develop. It is reported that in the UK alone, up to 19 million broilers die in their sheds from heart failure each year. In the case of no ventilation due to a power failure during a heat wave 20,000 chickens or broilers can die in a short period of time. Several research groups have developed "gait scores" (GS) to objectively rank the walking ability and lameness of broilers. In one example of these scales, GS=0 indicates normal walking ability, GS=3 indicates an obvious gait abnormality which affects the bird's ability to move about and GS=5 indicates a bird that cannot walk at all. GS=5 birds tried to use their wings to help them walking, or crawled along on their shanks, see Turner, J.; Garcés L. and Smith, W. (2005). "The Welfare of Broiler Chickens in the European Union" (Compassion in World Farming Trust. Retrieved Nov. 16, 2014). In one study, almost 26% of the birds examined were rated as GS=3 or above and can therefore be considered to have suffered from painful lameness.

In the first week, there can be slow growers, weak birds, lame chickens, infection by ascites diseases but usually in the first three weeks problems are low. Birds die under abnormal conditions such by heat stress during heat waves. The approximate heat energy uptake of a broiler or chicken is 67 KJ/kg. Above this value enthalpy causes increasing heat problems. From 74 KJ/kg it becomes critical because birds cannot dissipate the body heat anymore. 45% of heat dissipation of birds occurs by exhaling (respiration). If heat energy intake by hot air is higher than the ability to dissipate the heat, overheating is the consequence. The heat load is determined by temperature and humidity of the air. If the air reaches 32° C. and 80% relative humidity heat intake exceeds dissipation. Birds show hyperventilation and die of heart failure, and the broiler or chicken body can reach temperatures up to 46° C.

Young broilers can develop pulmonary hypertension syndrome, particularly if increased sodium or lung pathology (e.g. aspergillosis) is involved, and mortality is greatest after 5 weeks of age. There are typically no signs until right ventricular failure (RVF) occurs and ascites develops. Aspergillosis is related to wet litter where there is humidity and warmth. Because growth stops as RVF develops, affected broilers may be smaller than their pen mates.

Clinically affected broilers are cyanotic. Cyanosis refers to a dark bluish or purplish colouration of the skin and mucous membranes in chickens or broilers.

Chickens or broilers kept indoors but with reasonable space, e.g. around 12 to 14 birds per square metre, have a richer environment for example with natural light or straw bales that encourage foraging and perching. The broiler or chickens grow more slowly and live for up to two weeks longer than intensively farmed birds. The benefits of higher welfare indoor systems are the reduced (healthier) growth rate, less crowding and more opportunities for natural behaviour. Natural behaviours are such as pecking, scratching, foraging and exercise.

The lower the animal density the lower the problems described above. However, EU regulation allows up to 42 kg body mass birds/m$^2$ at the end of the fattening period.

If penned environments allow access to free areas there is an increase in losses by birds of prey and foxes. Hence there is a need to make indoor environments more suitable. However, commercial pressure can motivate use of a rapid growth rates and sometimes the largest broilers are affected by such problems. Occurrence of problems in males can be more frequent than in females. Ascites increases the respiratory rate and reduces exercise tolerance. Affected broilers frequently die on their backs.

Poultry can be affected by a variety of diseases and parasites. Two most serious diseases for poultry are Newcastle disease and avian influenza (bird flu). Other poultry diseases include chronic respiratory disease, fowl cholera, *salmonella, campylobacter* and internal parasites. *Salmonella* and *Campylobacter*, while being highly contagious but not pathogenic in poultry, cause serious illness in humans if they get into the food chain. Airborne dusts above poultry include grain and plant dusts, fungal spores, animal dander, bacteria and endotoxins. These can all cause diseases such as asthma, bronchitis and farmer's lung. Daily inspection of poultry by trained staff, in good lighting conditions, and independently of any automatic surveillance equipment, is considered to be the best method to prevent serious outbreaks of disease. These inspections are used to detect early signs of disease simply by noting changes in the behaviour and condition of individual hens, whereby early signs of ill health may include changes in food and water intake, in preening, in 'chatter' and in activity. There may also be a drop in egg production and changes in egg quality such as shell defects. But these inspections bring human beings into contact with the poultry and their environment and hence increase the risk of exposure of humans to harmful materials. Zoonoses are infections passed from animals to humans. Transmission may result from direct contact with a diseased animal, contaminated faeces or urine, or through consumption of contaminated farm produce. There are many different zoonoses which can also depend upon location, poultry breed etc. and some of these are notifiable. Common zoonoses include *Salmonella* and *Campylobacter* (which cause food poisoning), *E. coli* (which cause violent diarrhoea) and ringworm (a fungal skin infection). Good hygiene can prevent many types of zoonoses.

*E. coli* is present in poultry and the *E. coli* bacteria can survive for many weeks in faeces or soil. Infection is caused by eating contaminated food or contact with faeces.

*Chlamydophila psittaci* infection is thought to be common in a number of bird species such as turkeys, ducks and geese. Infection has also been recorded in people and the infection is recognised worldwide. Clinical signs of the disease include loss of appetite, dullness, laboured breathing, weight loss and diarrhoea.

Avian influenza (AI) is a notifiable disease.

Poultry farmers need to manage the risk, exposure and hence must control by, for example:
  minimising the risk of infection by keeping stock healthy, and vaccinating where appropriate
  ensuring good personal hygiene by washing before eating, drinking or smoking
  wearing overalls when handling animals, especially if they are sick, and gloves and a waterproof apron if handling products of birth or muck and sewage
  washing and covering all cuts and grazes
  monitor stock closely for any early warning signs.
  report notifiable diseases Although in the text here above, the focus is on a variety of issues for the intensive breeding of broilers, the reader will appreciate that similar issues, especially those related to animal health and sanitary conditions, arise for the breeding of other animals, such as pigs, sheep, goats, horses and cattle. For example, listeriosis is an infectious zoonotic disease in cattle which can be transferred to man by consumption of soft cheeses or of unpasteurised milk (although outbreaks involving pasteurized milk have been reported). Most infections are caused by the ingestion of infected low-quality silage. Infected cattle can develop a fever, among other symptoms, and shed the bacterium in milk, faeces and urine.

It will be clear from the above that it is crucial to follow the condition and welfare of the animals in the shed as closely as possible, preferably of each individual animal, as this allows for a rapid diagnosis of deviant behaviour by an animal, with an intervention of trained staff as a result. A rapid detection and isolation of the affected animal diminishes the risk of a disease spreading further in the shed. The isolated animal will then either be treated or killed and destroyed to prevent further spread.

It will also be clear that, for a variety of reasons, it can be advantageous to limit contact between trained staff and the animals in the shed, obviously within the prevailing legal framework. One such a reason involves the unfavourable conditions in the shed for man due to the presence of dust and ammonia. It should also be noted that intervention by man can result in the further spread of an epizootic in a thus far uninfected shed, as is the case for the spread of foot-and-mouth disease in cattle.

However, under the present farm practices humans are exposed every day to hazardous and harmful material.

Corrosion is probably the most serious problem in designing equipment for a poultry shed. The most common example of corrosion is iron rusting, but it can affect plastics, concrete, wood and other materials. One of the most noxious chemical found in poultry sheds is ammonia.

Ammonia is produced when the litter come in contact with moisture,—the wetter the litter, the more ammonia in the air. Ammonia has an impact on poultry. Ammonia, also attacks metal components in a poultry shed like steel or other metal products.

Most enclosed watering systems and feeding systems use plastic components, which are not affected by ammonia. Special galvanized steel is often used that can withstand the corrosive nature of ammonia efforts should be made to keep the litter dry. A problem is to design the watering system so that the poultry get all the water they need to thrive, but not so much that it will spill onto the litter/slats.

SUMMARY OF THE INVENTION

According to an aspect of the present invention, there is provided a system for monitoring the welfare of livestock in a shed, said system comprising
  a plurality of sensors for measuring ambient conditions in the shed;
  a robot, adapted to move through the shed, said robot comprising at least two cameras, one of which is a thermal camera;

a processing engine and a memory operatively associated with the processing engine, the processing engine being operatively associated with the robot and the plurality of sensors for receiving data recorded by the robot and the plurality of sensors, said recorded data comprising measurements of ambient conditions in the shed; images from said at least two cameras.

It is an advantage of the present invention that the welfare of the animals in the shed can be observed by use of, preferably continuous, measurements of the conditions in the shed as well via permanent "scanning" of animals that are in view of the robot's cameras. A continuous screening of the shed's animal population allows for a quick discovery of any anomalies in the shed, such as the beginning of potentially harmful diseases. Malfunctioning equipment, such as equipment for nourishing the animals, and deviations of ambient conditions in the shed from preferred, predetermined values are also quickly detected. The term "ambient conditions" include parameters such as temperature, atmospheric pressure, airflow, humidity, luminosity as well as the air concentration of ammonia and carbon dioxide. Furthermore, measurements of ambient conditions can also include the measurement of sound in the shed. The registration of sound in the shed has the advantage that stress and aggressive behaviour of the animals in the shed can be detected.

For the purpose of the invention, the term "livestock" refers to any animal that can be raised in an agricultural setting. In an embodiment of the system according to the present invention, livestock is poultry, cattle, pigs, sheep or goats.

It is an advantage of this invention that the system is applicable to the screening of different species of animals.

In an embodiment of the system according to the present invention, the plurality of sensors is part of the robot.

It is an advantage of this embodiment that ambient conditions can be measured in the vicinity of the screened animals.

In an embodiment of the system according to the present invention, the at least two cameras provide for a plurality of coupled images, one image being a thermal image. The processing engine is further adapted to analyse this plurality of coupled images for the detection of animals, animal droppings (litter), wetness e.g. of litter, temperature and/or equipment.

It is an advantage of this embodiment that the use of coupled images, being typically images taken at substantially the same moment and showing substantially the same objects, allow to gather relevant information of the objects. Preferably, said coupled images are taken at the same moment and show the same objects. More in particular, the combination of a photo taken by a video camera with a thermal photo of the same objects allows the recognition of animals and a comparison e.g. their body temperature. This allows detecting of feverish animals, as well as dead animals, which remain undetected in the thermal photo as their temperature will be the same as the background, hence due to the body temperature of the dead animals having decreased to ambient temperature.

It is a further advantage that animal droppings are detected. Analysis of droppings allows to evaluate the health level of the animals' overall digestive system. E.g. as broilers have a cloaca that is used by both the digestive and urogenital tract, an excess intake of water results in the evacuation of incompletely digested food, which can be detected by analysis of said plurality of coupled images. Also, the presence of blood in the droppings can be detected. Detection of wet litter can assist in providing a warning that ammonia levels are going to rise.

In an embodiment of the system according to the present invention, the livestock is poultry and the analysis involves detection of an individual animal by a combination of image signatures e.g. by detection of at least the head and the two legs of the individual animal.

It is an advantage of this embodiment that this allows for rapid and swift detection of a bird, as the head and the legs and feet generally have a higher temperature than the rest of the bird's body and hence show up on an image from a thermal camera.

In an embodiment of the system according to the present invention, the processing engine is configured for mapping measurements of ambient conditions over the whole or part of the shed area. This mapping can be carried out over a period of time thus generating historical records which can be correlated to any of disease, eating habits, aggression etc. One condition which is of importance is detecting the presence of wet litter that not only represents a health hazard for the poultry but also generates ammonia.

It is an advantage of this embodiment that this allows to recognize deviating parameters, which affect living conditions in a part of the shed area.

In an embodiment of the system according to the present invention, the robot is further provided with a device for marking an individual animal, said marking preferably being marking with paint.

It is an advantage of this embodiment that this allows to distinguish an animal that is possibly ill from the rest of the animals. The mark allows the intervening specialized staff to quickly spot the affected animal, due to the fact that even in confined spaces such as a shed, animals such as broilers tend to stay in a limited part of the shed. As a consequence, the specialized staff only spends a limited amount of time in the shed.

According to an aspect of the present invention, there is provided a robot for use in a system for monitoring the welfare of livestock for intensive meat production in a shed. The robot comprises at least two cameras for providing a plurality of coupled images, one camera being a thermal camera. The robot is operatively coupled to a processing engine for analysing said plurality of coupled images for detecting animals, animal droppings wetness of litter, temperatures, and/or equipment.

It is an advantage of this embodiment that the robot can help with the surveillance of intensive meat production in animals such as poultry. For example, the robot can detect at least GS4 or GS5 crippled birds autonomously, e.g. by observing lack of movement such as walking even when prodded, erratic walking, falling and can indicate where these are located in the shed or even remove them by itself if the robot has an attached trailer. The detecting robot can also call up a special heavy lift robot via a wireless connection, to gather the crippled or dead birds.

The robot can be adapted to travel through even a dense animal herd. The robot may have an articulated robot arm for taking samples or for collecting loose eggs.

In an embodiment, according to the present invention, the robot is adapted to travel over or on the floor. The robot has a number of wheels, each wheel being driven by a motor dedicated to that wheel, and each wheel having a traction surface coated with a non-stick material or the wheel being made of a non-stick material.

It is an advantage of this embodiment that the robot can move through the shed by travelling on the floor by use of its wheels without getting these wheels clogged.

In an alternative embodiment according to the present invention, the robot is operatively associated with a transport system having a set of rails, attached to the walls and/or ceiling of the shed, allowing the robot to move through the shed. The attachment to the walls and/or ceiling of the shed can be by wires or cables.

In an embodiment according to the present invention, the transport system comprises crossing means, which are at its ends operatively connected with the set of rails.

In an embodiment according to the present invention, the crossing means comprise a bar.

In an embodiment according to the present invention, the crossing means comprise a cable.

In an embodiment according to the present invention, the robot has a first part operatively connected to the crossing means, and a second part, operatively connected to the first part by use of a lowering system, the lowering system being suitable for lowering the second part of said robot to ground level or any intermediate level.

It is an advantage of this embodiment that the robot can approach every animal in the shed without the need of touching the ground, thereby avoiding the spread of possible diseases from one part of the shed to another, uncontaminated part. It is a further advantage of this embodiment that a robot that is in a high position regarding the animal population can quickly spot any abnormal behaviour in the shed. Such abnormal behaviour in the shed can be behaviour demonstrated by individual animals, as well as behaviour by a group of animals. A non-limiting example of the latter can be the avoidance of a particular area by the animals due to a deviation of preferred and predetermined ambient conditions. The high position and small size reduces the risk of frightening the birds.

In an embodiment according to the present invention, the lowering system comprises any one selected from the group consisting of a scissor lift, a cable lift, a spiral lift, a zip mast or a telescopic lift and combinations thereof.

According to an aspect of the present invention, there is provided a method for monitoring the welfare of livestock in a shed by use of a robot, that is adapted for traversing the shed, said robot having at least two cameras for providing a plurality of coupled images, one camera being a thermal camera, the method comprising:
  measuring ambient conditions in the shed by use of a plurality of sensors,
  capturing a plurality of coupled images by use of said at least two cameras,
  analysing said plurality of coupled images by a processing engine that is operatively associated with the robot for the presence of animals, animal droppings and/or equipment, and
  producing a warning signal upon the detection of sick or dead animals, abnormalities in the droppings, malfunctioning equipment or ambient conditions that are inconvenient with predetermined values.

It is thereby understood that said predetermined values are not only values that have been determined at a certain point in time by the user, but also values that have been adapted in time due to continuous observation by the robot with the purpose of maintaining the welfare of the animals in the shed.

According to an aspect of the present invention, there is provided a computer program product comprising code means configured to cause a processing engine to perform the functions of the system.

The technical effects and advantages of embodiments of the computer program product and the system according to the present invention correspond mutatis mutandis to those of the corresponding embodiments of the system according to the invention. A non-transient signal storage medium can be used for storing the computer program product, e.g. an optical disk (CDROM or DVD ROM) a magnetic tape, a hard disk, a solid state memory such as flash memory or similar.

The processing engine can be in the robot or can be in a computer system with which the camera can be placed in communication, e.g. via a wireless communication system. The processing engine is programmed with software that when run on the processing engine can analyse a plurality of coupled images from at least two cameras to monitor the welfare of livestock for intensive meat production in a shed.

The data from the sensors can be transmitted to a processing engine such as on the robot itself, or in a remote computer system. The transmission of data can be by wireless or by cable, e.g. when the robot is moving or at a docking station for charging and washing. The wireless connection can be a Near Field Communications system such as a WiFi, Zigbee, or Bluetooth system. The data can also be sent to an external platform such as smartphone, PC, etc. so that the farmer can have a real-time knowledge of what is happening to the poultry.

In a further aspect, the present invention provides a system for indoor localisation of a robot in a shed for livestock such as a poultry shed, especially for monitoring the welfare of the livestock such as poultry, comprising:
a first structure positioned in the shed for livestock such as the poultry shed, the first structure comprising a plurality of first discrete coded markers each having a front side visible from the floor of the shed for livestock such as the poultry shed;
a robot for traversing a trajectory across the floor of the shed for livestock such as the poultry shed,
the robot having a camera for obtaining an image of at least one of the first discrete coded markers,
a processing engine and a memory operatively associated with the processing engine, the processing engine being operatively associated with the robot for receiving the image of the at least one of the first discrete coded markers and for determining therefrom a position of the robot in the shed for livestock such as the poultry shed.

The first discrete coded markers include a code that allows the marker to be identified using the camera on the robot. The markers may be, for example any of, or any combination of:
illuminated markers,
retroreflective markers
colour coded markers
one dimensional or two-dimensional barcodes,
magnetic markers,
markers fixed to panels, etc.

Each marker preferably has a unique code visible on its front surface. The processing engine is preferably adapted to analyse an image from the camera and to recognise a code on the front surface of a marker. The unique code provides a unique positional reference for the robot as to its position. If the camera can capture an image of more than one marker more than one marker, the orientation and position can be determined from the placing of the markers in the image.

The processing engine can be in the robot or can be in a computer system with which the camera can be placed in communication, e.g. via a wireless communication system. The processing engine is programmed with software that when run on the processing engine can analyse images from the camera to determine the position of the robot from the known positions of the markers within the poultry shed. These known positions of the markers can be stored in a memory of the processing means or alternatively in the computer system.

The first structure can be placed at an elevated position above the floor, e.g. on a ceiling or on the underside of rafters. The first structure may also be a wall of the shed, although the elevated position is preferred.

To increase the accuracy of determining the location and orientation of the robot, first and second discrete coded markers can be used, e.g. the first markers at an elevated position with the front face of the markers facing the floor and hence visible by the camera when the camera is pointing vertically and second markers on a wall of the shed for livestock such as the poultry shed, each marker having a front side facing towards an inner part of the shed for livestock such as the poultry shed and hence being visible to the camera on the robot when the camera is oriented in the appropriate direction, e.g. in a vertical or a horizontal direction.

The code on the markers can include information as to the orientation of the robot, e.g. if the marker is on the ceiling or on the underside of rafters and the code is a barcode, the direction of the barcode lines in the image captured by the camera can be used to determine not only the position but also the orientation of the robot. This allows the processing engine to determine the next part of the trajectory based on a pre-stored route. Such a route can follow a space filling curve, such as a raster trajectory or a Peano curve to cover the full floor space of the shed.

The markers can include retroreflective or illuminated elements. This can provide a bright image in the camera which is easier to process. The robot may include illumination means such as LED light sources for illuminating the markers.

Preferably there are a plurality of discrete coded markers, each marker having a unique code visible on its front surface by the camera on the robot.

The camera preferably has means to orient the camera so that it faces in the appropriate direction to view the markers, e.g. vertically upwards or horizontally.

Preferably a motor is provided for moving the camera so that it faces in the appropriate direction to view the markers, e.g. vertically upwards or horizontally or any other angle.

A gyroscope can be provided on the robot, the motor using the gyroscope to orient the camera so that it faces in the appropriate direction to view the markers, e.g. vertically upwards or horizontally.

Preferably the camera is adapted to obtain an image of three first discrete coded markers. The processing engine can be adapted to derive the position of the robot in the shed for livestock such as the poultry shed allowing for the camera not being aligned with the vertical or horizontal.

The images captured by the camera can be stored in a memory, e.g. on the robot or in the computer system. The computer system can have a monitor adapted to display images captured by the camera and/or stored in memory.

With such a system the position of the robot in the shed for livestock such as the poultry shed can be determined to within 10 cm.

In another aspect of the present invention a method for indoor localisation of a robot in a shed for livestock such as a poultry shed is provided, the shed having a first structure positioned to be visible from the floor of the poultry shed, the first structure comprising a plurality of first discrete coded markers each having a front side visible from the floor; the robot being adapted for traversing a trajectory across the floor of the shed for livestock such as the poultry shed, the robot having a camera for obtaining an image of at least one first discrete coded marker, the method comprising:
capturing the image of at least one first discrete coded marker; and
determining therefrom a position of the robot in the poultry shed.

The position and the orientation can be determined.

Preferably, a plurality of discrete coded markers are provided, each marker having a unique code visible on its front surface, whereby the method further comprises:
capturing an image of at least three of the first discrete coded markers, and deriving the position of the robot in the shed for livestock such as the poultry shed allowing for the camera not being aligned with the vertical. The position of the robot in the shed for livestock such as the poultry shed can be determined to within 10 cm.

The robot can have an articulated chassis comprising two tubes in parallel connected to a cross tube at the front and a cross tube at the back via tubular T pieces. The motors can be included within the front and back cross tubes. This form of chassis can flex so that one wheel can be on a raised portion of the ground and yet all wheels stay on the ground. This form of articulated chassis is advantageous as there are no moving parts.

The robot can include wheels whose traction surfaces can be coated with a non-stick material such as a non-stick polymer such as PTFE. Alternatively the wheels can be made from a non-stick polymer such as PTFE. The wheels may be sealed so that litter cannot enter in the wheels.

Embodiments of the present invention provide a surveillance assistance robot to take care of livestock and farm animals such as broiler or chickens in a poultry farm. The robot is based on a mobile platform with a number of wheels such as 4 wheels that carries a series of sensors, e.g. various types of camera such as any of or all of optical, hyperspectral, infrared, thermographic, time of flight cameras, various sensors such as temperature, humidity, sound, ammonia sensors, which allow direct measurements of the environmental conditions in the shed. The robot can also equipped with other type of sensors such as an audio sensor (microphones), an ultrasonic and/or inertial sensor, a compass, and a radar system that allow it to control its movement as well as a gyroscope or other devices such as e.g. an LSM6DS33, iNEMO inertial module being an always-on 3D accelerometer and 3D gyroscope, an LIS3MDL digital output magnetic sensor, 3-axis magnetometer, LPS25H MEMS pressure sensor: 260-1260 hPa absolute digital output barometer all supplied by STMicroelectronics NV, or an Ultrasonic Ranging Module HC-SR04, ElecFreaks Technology Ltd. China.

The data from the sensors can be transmitted to a processing engine such as on the robot itself, or in a remote computer system. The transmission of data can be by wireless or by cable, e.g. when the robot is moving or at a docking station for charging and washing. The wireless connection can be a Near Field Communications system such as a WiFi, Zigbee, or Bluetooth system. The data can also be sent to an external platform such as smartphone, PC, etc. so that the farmer can have a real-time knowledge of what is happening to the livestock such as poultry.

The robot can help with the surveillance of intensive meat production in animals such as poultry. For example the robot can detect at least GS4 or GS5 crippled birds autonomously, e.g. by observing lack of movement such as walking even when prodded, erratic walking, falling and can indicate where these are located in the shed or even remove them if the robot has an attached trailer. The detecting robot can also call up a special heavy lift robot via a wireless connection, to gather the crippled or dead birds.

The robot is adapted to travel through even a dense animal herd. The robot may have an articulated robot arm for taking samples or for collecting loose eggs.

In another aspect of the present invention, a system for indoor localisation of a robot in a shed for livestock such as a poultry shed, comprising:
a first structure visible from the floor of the shed for livestock such as the poultry shed, the first structure comprising a plurality of first discrete coded markers each having a front side visible from the floor of the shed for livestock such as the poultry shed;
a robot for traversing a trajectory across the floor of the shed for livestock such as the poultry shed,
the robot having a camera for obtaining an image of at least one of the first discrete coded markers,
a processing engine and a memory operatively associated with the processing engine,
the processing engine being operatively associated with the robot for receiving the image of the at least one first discrete coded markers; and for determining therefrom a position of the robot in the shed for livestock such as the poultry shed.

The first discrete coded markers can be located at an elevated position above the floor further comprising second discrete coded markers on a wall of the shed for livestock such as the poultry shed, each second discrete coded marker having a front side facing towards an inner part of the shed for livestock such as the poultry shed. The discrete coded markers can include marker elements, the marker elements being any of reflective elements, retroreflective elements, illuminated elements, rod elements, bar elements, rectangular elements, colour coded elements.

There can be a plurality of first and/or second discrete coded markers, each marker having a unique code visible on its front surface from a camera mounted on the robot. The camera can have a means to orient the camera so that it faces vertically upwards or horizontally. A gyroscope can also be included, the motor using the gyroscope to orient the camera so that it faces vertically upwards or horizontally. The camera can be adapted to obtain a single image of three first and/or second discrete coded markers.

An inertial platform can be provided, wherein the processing engine is adapted to derive the position of the robot in the shed for livestock such as the poultry shed or to record the trajectory of the robot through odometry and/or the inertial platform. The images captured by the camera can be stored in a memory. The system can comprise a monitor adapted to display images captured by the camera and/or stored in memory. The position of the robot in the shed for livestock such as the poultry shed is preferably determined to within 10 cm.

The robot can have a number of wheels, each wheel having a traction surface coated with a non-stick material or the wheel being made of a non-stick material.

In another aspect a robot is provided for use in a robot surveillance system for intensive meat production in a shed for livestock such as a poultry shed, the robot comprising a plurality of sensors and at least two cameras, and a processing engine for analysing images captured by one of the cameras for determining a position of the robot in a shed for livestock such as a poultry shed, the robot having a number of wheels each wheel being driven by a motor dedicated to that wheel, and each wheel having a traction surface coated with a non-stick material or the wheel being made of a non-stick material.

In another aspect the present invention provides a method for indoor localisation of a robot in a shed for livestock such as a poultry shed, the shed having a first structure visible from the floor of the shed for livestock such as the poultry shed, the first structure comprising a plurality of first discrete coded markers each having a front side visible from the floor of the shed for livestock such as the poultry shed and each marker having a unique code visible on its front surface; the robot being adapted for traversing a trajectory across the floor of the shed for livestock such as the poultry shed, the robot having a camera for obtaining an image of at least one of the first discrete coded markers, the method comprising:
capturing the image of at least one of the first discrete coded markers;
recognising a code on the at least one first discrete coded marker, and
determining therefrom a position of the robot in the shed for livestock such as the poultry shed. A plurality of first discrete coded markers can be provided, and the method can further comprise:
capturing an image of at least three first discrete coded markers, and
deriving the position and/or orientation of the robot in the shed for livestock such as the poultry shed. The position of the robot in the shed for livestock such as the poultry shed is preferably determined to within 10 cm.

DETAILED DESCRIPTION OF THE INVENTION

Figure 1:
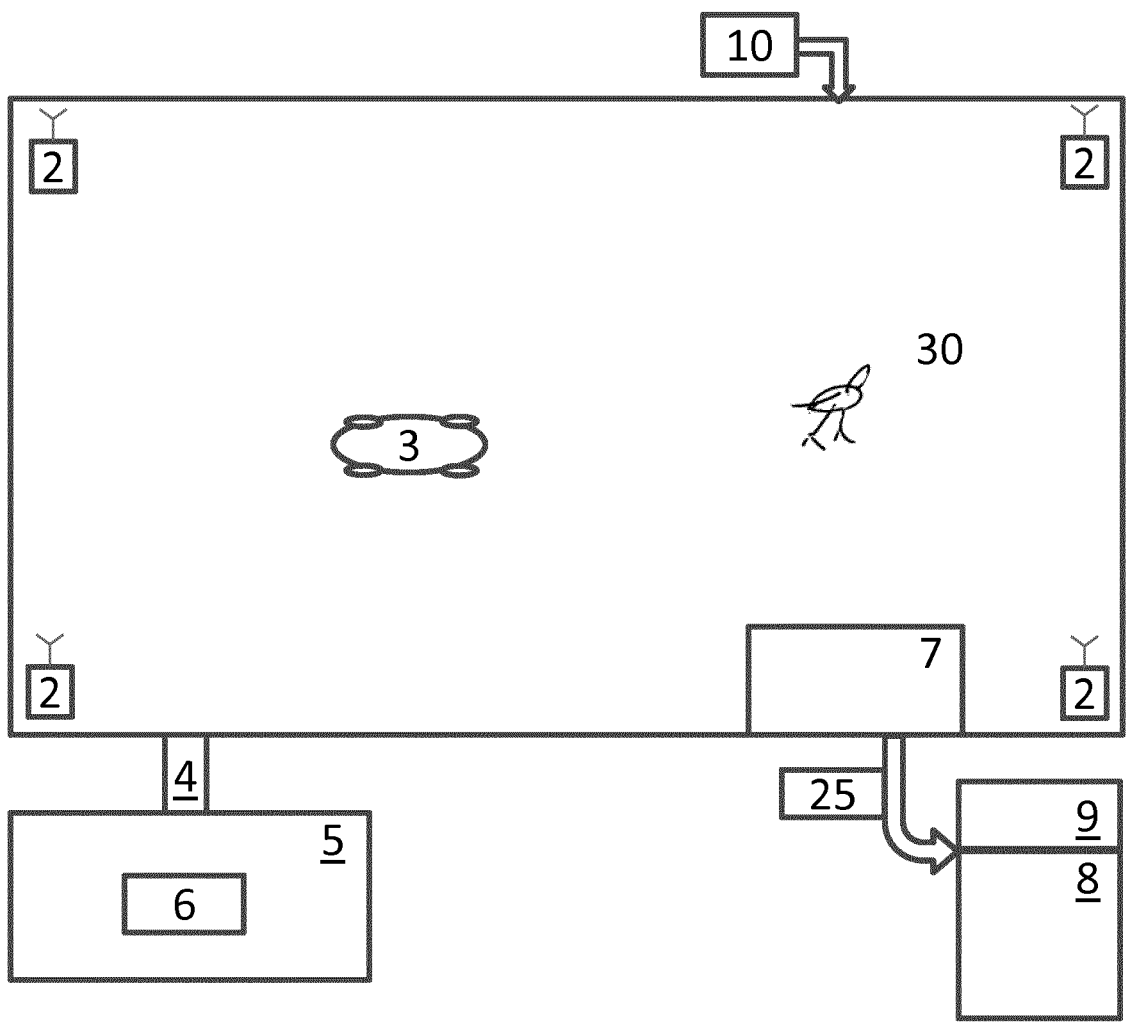
FIG. 1 shows a top view of a poultry shed according to an embodiment of the present invention.
Figure 2:
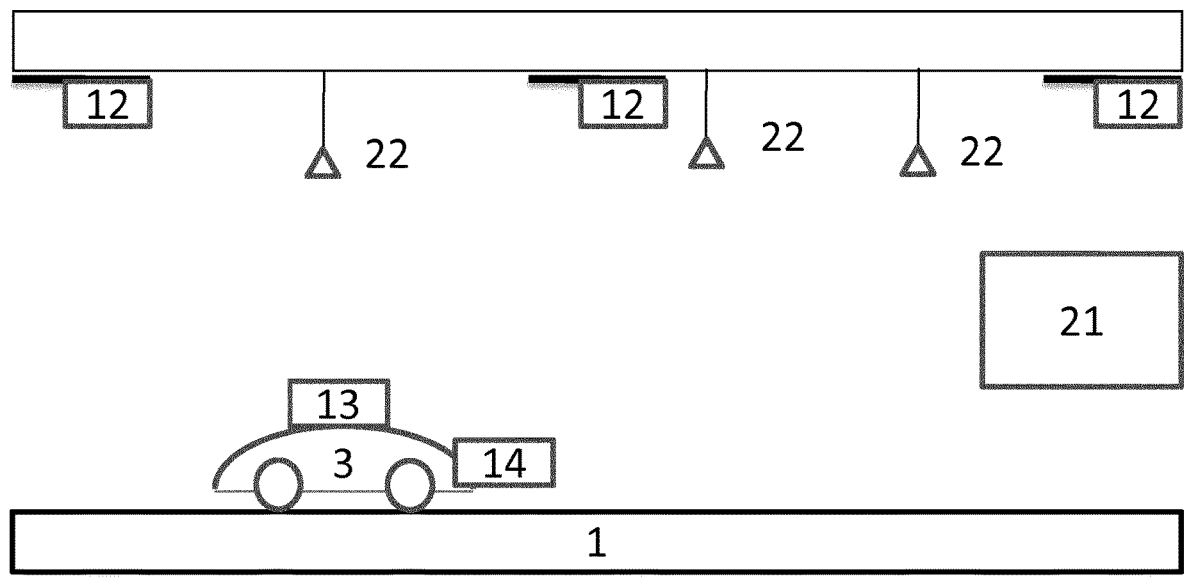
FIG. 2 shows a side view of a poultry shed according to an embodiment of the present invention.
Figure 3:
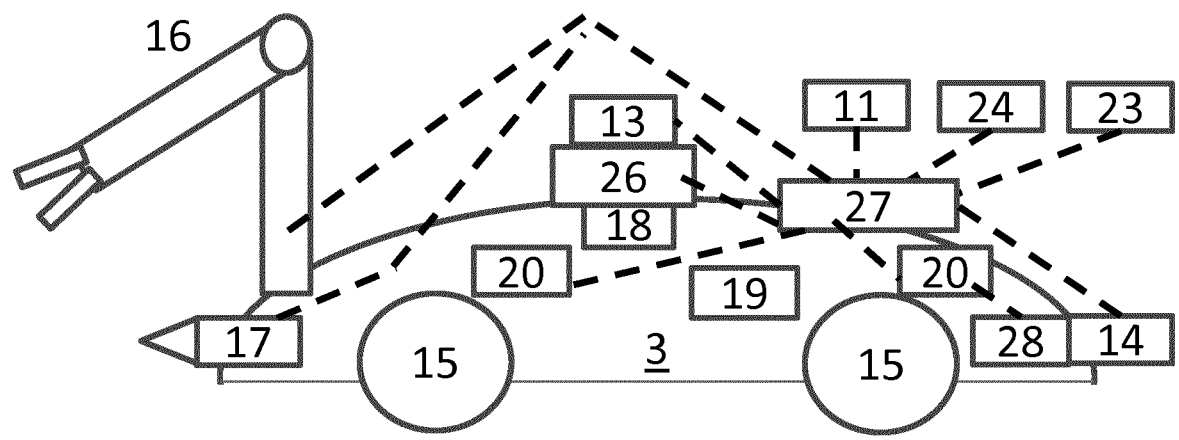
FIG. 3 shows a side view of robot according to an embodiment of the present invention.

Embodiments of the present invention will be described with reference to FIGS. 1 to 5. FIG. 1 shows a top view of a poultry shed 10. Poultry includes, chickens (including bantams), turkeys, ducks, geese, partridges, quail, pheasants, pigeons—reared for meat, guinea fowl, ostriches, emus and rheas, but the present invention will be described in an exemplary way with respect to broilers 1. Shed 10 is equipped with a wireless communication system with one or more wireless transceivers 2. "Wireless" includes radio frequency short range communication systems such as WiFi (IEEE 802.11), or Bluetooth (IEEE 802.15.1), or Zigbee (IEEE 802.15.4) and also includes infrared communication systems including point-to-point but more preferably diffuse infrared communication systems. A robot 3 is adapted to travel over the floor 1 of the shed 10. Robot 3 is preferably a self-cleaning 4WD (Four-wheel drive), self-driven, autonomous robot in which each wheel 15 is driven independently by a motor such as by N×360° Servomotors (AR-3606HB) whereby N can be four if there are four wheels 15. The traction surfaces of wheels 15 are preferably covered or made from a non-stick material such as PTFE. This helps to prevent build-up of faeces on the wheels 15. To improve traction the surface of the wheels can be profiled or structured.

Robot 3 can be a variable speed robot with a floor speed of from 0.2 to 1 m/s, the motors 15 being controlled by a processing engine 27. Processing engine 27 includes a memory and can be programmed to make the robot execute a trajectory within the shed 10. For example, the robot can follow a space filling curve such as a raster trajectory (back and forwards across the shed) or a Peano curve in order to make sure that all parts of the shed 10 are traversed. Software running on the processing engine 27 can be an operating system running on a Raspberry Pi 3 or 2×Arduino UNO as microcontrollers. The robot size can be 30×40×30 cm, for example. Weight of robot 3 can be 1 to 5 kg, for example depending on the size and capacity of the on-board rechargeable electric energy storage device such as one or more batteries 28.

Figure 5:
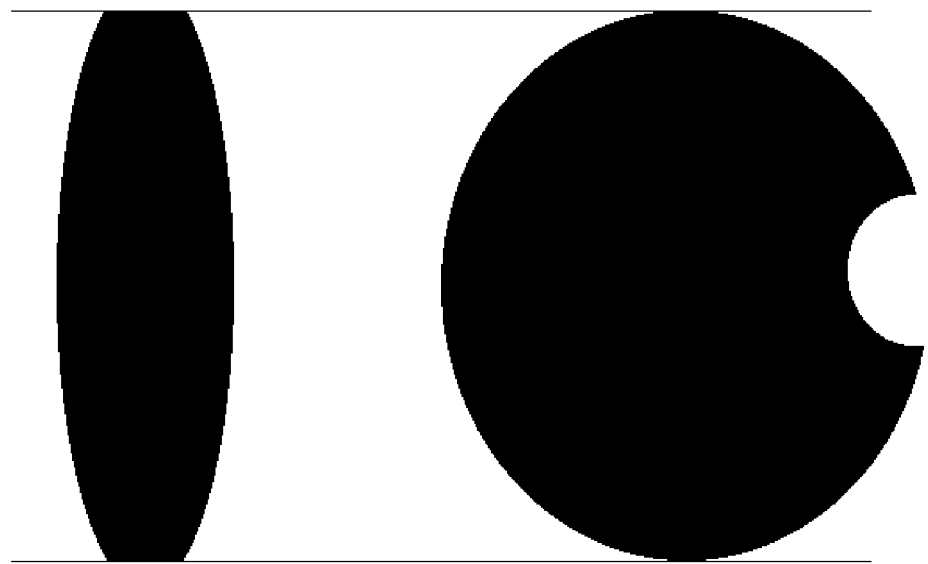
FIG. 5 shows a wheel according to an embodiment of the present invention.

The floor 1 will collect droppings or litter from the chickens 30 over a period of time such as 6 weeks before being cleaned. Robot 3 is adapted to travel over the floor 1 when covered with droppings or litter. Robot 3 is adapted to communicate with the transceivers 2 wirelessly and is equipped with an antenna 29a and a transceiver 29b (not shown in the figures) which is connected to a digital processing device 27 which includes a processing engine such as a microprocessor or FPGA as well as memory and I/O ports and which is adapted to communicate bi-directionally with transceivers 2 for the exchange of commands, to download images or videos, to download test results such as temperature, humidity, level of a gas such as ammonia, audio recordings, or other data. The shed 10 also includes a docking station 7 which is designed to couple with a docking port 14 of robot 3 automatically for charging of the on-board battery 28, and optionally downloading of information such as images, videos or test results. The docking station 7 preferably has an integrated washing station, e.g. located below the position where the robot 3 docks to station 7, which has liquid spraying and drying equipment especially for the cleaning of the underside of robot 3 and especially for the cleaning of the robot wheels 15. The integrated washing station is also preferably arranged for the cleaning of the cameras. As shown in FIG. 5 the wheels can have a low form factor when viewed along the direction of travel and a large form factor when viewed from the side. The surface of the wheel is preferably enclosed so that litter cannot enter into the wheel. As each wheel 15 preferably has its own motor 20 this reduces the number of moving parts in the robot 3 as a transmission is not required which can become clogged. The wheels 15 can be driven during the cleaning process. In addition to liquid sprays such as cold and/or hot water sprays, the cleaning station may be equipped with scrapers and/or brushes. The cleaning process may be controlled by a computing system 8 which is preferably in bi-directional communication with robot 3 (when docked) over a communication link 25 which can be a cable or wireless link. During the cleaning process, which may take up to 6 hours per day during the night when the broilers sleep, data from the processing engine and memory 27 of robot 3 can be downloaded to storage on the computer system 8. System 8 can be connected to a data network such as the Internet with suitable network cards to allow bi-directional communication with a remote computer, e.g. for remote surveillance. Said remote computer can be connected to or part of a cloud platform. System 8 can include a monitor or display 9 for viewing all outputs of the sensors 23, cameras, microphones etc. and received videos and images in real time or off-line or for viewing archived data.

As can be understood from the above and additional information below, robot 3 is a self-cleaning autonomous robot. To carry out its functions the robot 3 preferably has a number of sensors 23 all of which can be connected to processing engine 27 for recording and storage of output values and on-board analysis of the results. Alternatively, the outputs of the sensors 23 can be transferred to the computer system 8 via the wireless transceivers and the results stored and analysed there, e.g. remotely. Sensors 23 can include sensors for temperature, and/or for humidity, and/or various types of cameras such as one or more cameras selected from a video camera, a hyperspectral camera, an infrared camera, a time of flight camera and/or a thermographic camera. The sensors 23 can optionally be mounted where appropriate in a protected dome of the robot 3. One or more cameras may be mounted in a movable turret 23 driven by a motor 26 under control of the processing engine 27. Such cameras are movable to view the ceiling or walls of shed 10 and in particular to view distributed coded markers 12 in or on the ceiling which can be used by the robot 3 to find its location to within 10 cm or less. Robot 3 may have the one or more cameras and the camera turret mounted on a suspended plate which can swing freely and take on a horizontal position or robot 3 can be equipped with a digital gyroscope 18 to orient one or more cameras in a vertical direction. The robot 3 may also be equipped with a digital compass as a further aid for orientation and routing of the robot 3 in the shed 10. The robot 3 can have one or more microphones 11 which are also, preferably connected with processing engine 27. The microphones 11 can be used to pick up sounds from the broilers, especially sounds indicative of disease such as coughing, sneezing, and/or rales. Ascites increases the respiratory rate and the microphone can detect, e.g. extract from background noise cyclic noises such the noise of faster breathing. Processing engine 27 can be programmed to analyse such sounds based on signature sounds recorded for sick broilers or by other audio recognition techniques known to the skilled person. In an embodiment of the invention, the robot 3 has at least two microphones. The advantage of using two microphones is that the source of a particular sound can be tracked. The robot 3 can be configured to move to said source in an independent manner or on request by the system user.

Outputs of a temperature sensor can be processed autonomously by the on-board processing engine 27 or by the computer system 8 to determine if the poultry is receiving too much heat energy, and the computer system 8 or the processing engine 27 can be adapted to send commands to ventilators 21 to start or stop ventilators 21 to control the temperature inside the shed 10. The robot 3 can measure relative humidity and temperature with the appropriate sensors and the processing engine 27 or computer 8 can calculate Heat Load (KJ/kg) received by the birds. If this level is too high the robot 3 or the computer system 8 can increase ventilation and/or start cooling facilities autonomously. If electric power has cut out a back-up power plant can be activated by commands from the robot and the robot can raise an alarm if the temperature is not under control.

Outputs of an ammonia and/or carbon dioxide sensor 24 can be processed by the on-board processing engine 27 or the computer system 8 to determine if the air environment of the poultry is hazardous for the welfare of the broilers and the computer system 8 or the processing engine 27 can be adapted to send commands to ventilators 21 to start or stop ventilators 21 to control air purity inside the shed 10.

Outputs of a humidity sensor 23 can be processed by the on-board processing engine 27 or the computer system 8, preferably in combination with airflow and temperature measurements, to determine if the air environment of the poultry is uncomfortable for the welfare of the broilers and the computer system 8 or the processing engine 27 can be adapted to send commands to ventilators 21 to start or stop ventilators 21 or to activate heaters or cooling devices to control air humidity inside the shed 10 or to switch on air conditioners when the ventilators 21 are implemented as air conditioners.

Outputs of the cameras can be processed by the on-board processing engine 27 or the computer system 8 to determine if the lighting is inappropriate and the computer system 8 or the processing engine 27 can be adapted to send commands to lamps 22 to control the illumination in shed 10 and/or to control coloured lamps to flood the shed with a particular colour. Coloured light such as green and blue light is believed to have a calming effect on broilers. Clinically affected broilers are cyanotic. Cyanosis refers to a dark bluish or purplish colouration of the skin and mucous membranes in chickens or broilers. An optical camera can detect such as abnormal colour of the head of the bird. Natural behaviours are pecking, scratching, foraging and exercise. A camera on robot 3 can detect pecking, scratching, foraging and exercise for indoor broilers using image analysis of images from an optical camera in combination if required with images from a thermographic camera.

Robot 3 can be equipped with an articulated robot arm 16 provided with motors to give 6DoF movements. The robot arm 16 can be equipped with stepper motors and encoders at joints to measure angular and/or linear movements and to control the 6DoF motions of the robot arm 16. The robotic arm 16 can be equipped with a hand or claw on a remote end thereof and can be driven under the control of the processing engine 27 to take samples of food and/or of bodily wastes such as faeces or vomit or collect loose eggs. In certain embodiments, the robotic arm 16 is configured for picking up and collecting dead or sick birds. These samples may be stored in a specific storage space 19 on robot 3 which can be sealed and/or cooled e.g. by a Peltier element. The robot arm 16 can be adapted to unload such samples onto a transport mechanism 4, e.g. a conveyor belt 4 that brings the samples to an analysis device 6 such as a desktop diagnostic device. This diagnostic device 6 can be a desktop device adapted to provide diagnosis on parasitic, bacterial and/or viral infections within a time such as 150 minutes. Such devices are marketed under the name Idylla™ by Biocartis NV, Mechelen, Belgium.

To avoid contact between humans and bodily wastes of the broilers but allow manipulation and analysis of samples a glove box 5 can be provided and the diagnostic device 6 can be housed in the glove box, for example. Alternatively, or additionally a microscope can be available in the glove box to allow human microscopic examination of samples.

It is preferred if the robot 3 is aware of its position within an accuracy of 10 cm or less. This is advantageous because the robot 3 is preferably adapted to determine if certain broilers are showing signs of sickness or other distress, are overweight and suffering from painful burns, or painful lameness or are dead or dying. Once such a broiler has been identified it can be marked with a paint gun 17. Also, the position of robot 3 at this moment can be noted and communicated to the farmer via the wireless transceivers 2 for example and the farmer can go to the spot and retrieve the affected broiler having received the location of the bird from the robot 3. This reduces the time that the farmer needs to be in the shed and hence reduces biohazards.

The present invention includes the use of a wireless indoor localisation system to locate the position of robot 3. For example, triangulation techniques can be used based on the use of several distributed wireless transceivers 2. However, these methods generally do not locate such a robot very accurately. A preferred method is to use a plurality of coded markers 12 in the shed 10, e.g. on the ceiling of shed 10 or at any suitable intermediate elevated position between the ceiling and the robot 3 or on the walls of the shed. A camera in turret 13 can be moved by a motor 26 optionally under control of the gyroscope 18 and the processing engine 27 or the computer system 8 to a position directed in an appropriate direction such as vertically upwards, and the camera captures images of one or more markers 12 at the elevated position, e.g. on the ceiling or on the underside of rafters. Alternatively, the motor 26 moves the camera to a horizontal position to capture images of the coded markers on a wall or walls. From these images, however they have been captured, the on-board processor 27 or the computer system 8 can determine the position of robot 3. The processing engine 27 or the computer system 8 can be programmed with software which when executed on the processing engine 27 or the computer system 8, is able to carry out image analysis of the captured images showing the unique codes on the coded markers such as a one-dimensional or two-dimensional barcodes and to obtain the position of the robot 3 and preferably the orientation of the robot 3 on the floor of the shed 10. The positions of the markers 12 within the shed 10 can be stored in the memory of the processing engine 27 or of the computer system 8.

With only one camera on the robot and the camera pointing up to the ceiling, and a plurality of coded markers distributed over the elevated position in the shed and one of the ceiling marker 12 with a visible code being captured by an on-board camera this is sufficient for the processing engine 27 of the robot 3 or of the computer system 8 to determine the position of the robot to within 10 cm. For example, 4 corners and sides of the marker (a rectangle for example), and a colour code on the marker 12 can be used as marker elements. An image showing a deformed arrangement of these marker elements (i.e. compared with the stored image of this marker) would indicate that the camera is not directed vertically and the deformation of the markers in the image can be used to increase the accuracy/reliability of the position measurement. With more than one marker element being visible in an image captured by the on-board camera, the calculation error decreases exponentially with the number of visible markers.

For example, if the camera can view at least three markers in one image, the processing engine 27 or the computer 8 can reconstruct the position of the camera (6 DOF). The gyroscope 18 in combination with one or more markers and a camera whose orientation is controlled by the gyroscope can provide accurate positional information. The height of the ceiling can be a known parameter, or a Time of Flight camera can be used to measure this distance from the robot to the marker. Multiple consecutive images can be captured by the camera while driving, where the path is recorded through odometry and/or inertial platform. Triangulation can be performed with one target on the ceiling, and a known baseline on the ground (travelled path). This also enables triangulation.

The markers 12 can be reflective markers such as retroreflective markers, or illuminated markers, colour coded or geometrically coded markers for example. Robot 3 may have light sources such as LED light sources to illuminate the markers 12.

A further option for localization of robot 3 is to use a camera based solution, whereby passive retroreflective markers are placed on the ceiling or at an intermediate level and eventually on the walls of the shed 10. Each marker provides a unique fingerprint. Based on triangulation calculation, the 6DOF position of the robot 3 with respect to fixed environment reference frames can be calculated, e.g. by the processing engine 27 or computer system 8. The retroreflective targets can host some ID, e.g. by realising a matrix of 4×4 retroreflective dots, $2^{16}$ combinations (=64000) can be generated. A 3×3 matrix results in 512 unique identifiable combinations. This is large enough to identify the reflector and to localise the robot 3. Optionally, one or more dot scans be added to indicate the XY axes in the coordinate system of the retroreflective target (2D target) in order to be able to determine the orientation of the robot on the ground.

A narrow bandpass filter can be applied on a specific camera on the robot 3, together with an infrared LED illumination (860 nm) on the robot 3, pointing in the direction of the camera, and providing a synchronised pulsation, so that the on-board camera sees infrared illuminated target(s) against a dark background). Pixel interpolation (factor 10 to 100), can be used to increase the resolution of the camera by the same factor, resulting in very accurate measurements (<10 cm).

The calibration of the different retroreflective targets can be done using a theodolite system, or a laser scanner.

A further option for localization of robot 3 is to use magnetic markers, wherein said magnetic markers are placed on the ceiling or at an intermediate level and eventually on the walls of the shed 10. The robot 3 comprises at least one Hall sensor as well as a configuration for describing the distance between two magnetic markers.

A separate handheld camera device can be used to identify the 6 DOF position of objects in the environment (feeding lines, walls, . . . ). Hence there is no need for an accurate overall measurement of the different retroreflectors. Robot position measurements are then performed relative to the objects in the environment, through the use of the retroreflector coordinate system. This system can be non-linear. Retroreflectors can be placed, e.g. on a grid of 10×10 m at the ceiling of the stable, resulting in 4×9=36 reflectors for a shed 10 of 100 m×50 m.

Robot positioning is then performed by reading out the camera coordinates, in a specific robot position. Robot navigation is then performed by continuously measuring the X,Y,Z coordinates, and by comparing these actual positions with the planned positions along the programmed path of the robot 3. Deviations between measured and planned position gives provides an input to a correction of the actual robot path, so that the errors are minimized.

This robot positioning and navigation solution can be enriched from a data point of view, and from a positioning accuracy point of view by using following one or both of the solutions:

1. inertial navigation (6DOF) and compass information (1 DOF=rotation in the motion plane)
2. odometry, by measuring the different wheel motions (3 DOF: X, Y and rotation in the plane of motion) and storing these over time.

Kalman filtering can be used to compose the different position information, e.g. odometry can be preferentially used for short range information, as well as the inertial navigation data. Encoders with outputs to the processing engine 27 can be provided for each wheel to determine how far the robot 3 has travelled in any direction. The compass information can be used for the long-term orientation updates (no drift). The compass data can be used to compensate the odometry rotational drift (slip), and the inertial navigation drift (accelerometer based input, and gyro input data).

Another solution consists of a reduced set of retroreflective targets (with or without ID), so that an accurate robot position can be measured e.g. for a docking manoeuvre. An example of a docking manoeuvre is the approach path towards a robot docking and charging station. The path between two locations can then be measured using the other position data calculation solutions (inertial, odometry, compass, . . . ). In this way, the robot 3 is free ranging between multiple sets of retroreflectors. The main advantage is that retroreflectors only need to be mounted in specific locations of interest (charging station, docking station, loading—unloading station, biological safe port/door/interface, . . . ).

Further functions of the poultry shed self-cleaning autonomous robot 3 will now be described.

A main function of the robot 3 is the ability to move powered and controlled by itself inside the poultry shed between the birds. The processing engine 27 can be programmed with checkpoints or can controlled directly by the user. It can be provided with ultrasonic or radar sensors to detect the distance the robot 3 is away from any obstacle (alive or not).

The data gathered by the sensors mentioned above can be sent using the indoor wireless communication system to the external computer system 8 where a user can see in real-time what is being recorded by the robot 3. A monitor 9 can be provided in the computer system 8 for viewing any images or data. Cameras can be provided on the robot that allow night-vision.

Robot 3 can have a number such as four wheels individually driven by motors 20 so that the robot can drive in any direction, either forwards or backwards or in curves. Wheels 15 can have a diameter between 5 and 15 cm for example. The traction surface can be covered or be made of a non-stick material such as PTFE to avoid the adhesion of chicken faeces, ground, straw, feathers or any typical materials inside a poultry shed. The use of non-stick (e.g. PTFE) wheels or a non-stick coating (e.g. PTFE) for the traction surfaces of the wheels enables a self-cleaning wheel design, to get rid of the litter. The friction coefficient of PTFE is low: 0.05 to 0.1. Using a structured traction surface such as cavities on the contact surface with the ground, friction can be increased to a value close to 1 (shown schematically in FIG. 5). Using cavities (e.g. teeth) with an opening angle of +90°, self-cleaning will be increased. A scraping mechanism can be mounted to keep the wheel surface and flanges litter free.

The motors 20 can be servo motors, e.g. four wheels and four motors used to move the robot 3 and to guide it. Moving the motors in different speeds and orientations the robot can change its direction in a long radius curve, turning without moving or a combination of these. In addition, four motors and four wheels has the advantage of not losing the traction even if three of the wheels are sliding.

Sensors are provided for measure different aspects relating to poultry husbandry such as any, some or all of humidity, temperature, airflow, carbon dioxide, ammonia, luminosity, noise/audio, etc. In addition, one or more cameras are provided to obtain real time image video and optionally sound.

The robot 3 is equipped with a processing engine 27 such as a Raspberry Pi 3, which is a microprocessor, equipped with wireless (WiFi) and serial (USB) ports. The function in the robot 3 can be controlled through the wireless communication with transceivers 2, e.g. by transmission of the real-time data as video and sound captured by an on-board camera. Alternatively, the robot 3 can store data on-board and download it when placed at the docking station 7. The robot 3 can be controlled by microcontrollers such as is by two or more Arduino UNO microcontrollers. For example, one of these microcontrollers can be adapted to read the sensors to know the status of the vehicle. For this purpose, the robot can have a number such as six ultrasonic sensors located at different positions on the robot 3, e.g. three in front, three in the rear, to always be able to determine distances to objects. An IMU (Inertial Measurement Unit) plus a compass can also be provided. With this combination of devices, the robot 3 can control by itself where it is and which is the best route avoiding obstacles. The other microcontroller, following the program instructions, can control the vehicle and send commands to each servo motor to adapt the speed and the direction of the vehicle. To improve the operational stability of the system, each microcontroller such as the Arduino controls the status of the other one, and has the capability to restart it if needed. This microcontroller also can receive instructions from the microprocessor Raspberry Pi, concerning movement, speed and position, e.g. predetermined or determined by a user.

Robot 3 can have four wheels positioned in two separated axes. For a rigid system, these can be connected to a plate. However, it is preferred to make use of an adaptive chassis with no moving parts. This system can be based for instance in the use of a number such as two plastic tubes running the length of the robot 3 connected with tubular 'T' connectors to a cross tube at the front and rear of the robot 3. The cross-tubes can house the motors 20 and journaled connections to the wheels 15. This form of chassis can distort under load e.g. when one wheel is higher than the others. The chassis goes into torsion with one raised wheel but with this wheel and the other wheels being in full contact with the terrain.

On such chassis one or more platforms can be secured for housing the electronics, battery, motors sensors, cameras etc. The robot 3 can be protected with a cover, e.g. a dome.

The microprocessor such as the Raspberry Pi 3 can be connected to the microcontroller such as an Arduino UNO (A) for control of the motors 20, 26 via a serial port for example. This allows the microprocessor such as the Raspberry Pi 3 to send control signals to the microcontroller such as the Arduino UNO (A) using libraries and also allows the microcontroller such as the Arduino UNO (A) to send data to the microprocessor such as the Raspberry Pi 3. The microcontroller such as the Arduino UNO (B) which is in charge of gathering data from the sensors and cameras is adapted to send this data to the microcontroller such as the Arduino UNO (A) via I2C (Inter-Integrated Circuit), a serial bus that allows multi-master and multi-slaves devices. The microcontroller such as the Arduino UNO (A), which sends the data to the microprocessor such as the Raspberry Pi 3, can act as a Master, asking data to the Slave microcontroller such as the Arduino UNO (B). This gathers the data and send sends using the bus to the Master. This communication between the two microcontrollers Arduino and the microprocessor such as the Raspberry to control operation such that if a sensor, camera or a motor is not working as expected, it can adapt to this situation stopping the program, or making a Warning or Error signal for the user.

Advantages of the present invention for the poultry are one or more of: All operations which improve poultry welfare are integrated such as:

Use of cameras and other dedicated sensors to monitor lighting, temperature, humidity, airflow, carbon dioxide and ammonia concentration and, by means of a control system including ventilation and/or air conditioner is used to adapt these to provide more comfort.

Use thermographic camera to view chickens and recognize them by a three-point test—two feet and head all of which shows up as of higher temperature than other parts of the birds.

Use camera and image analysis to detect aggressive chickens, mark them, e.g. with a paintball and alarm/inform the farmer.

Figure 4:
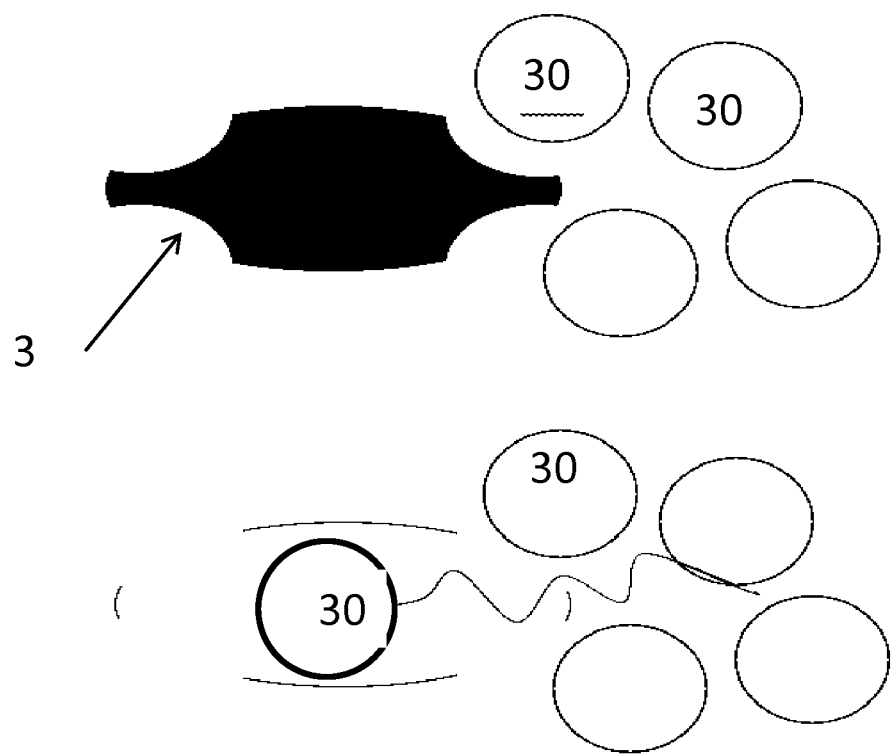
FIG. 4 shows a top view of a robot according to an embodiment of the present invention.

Use camera and image analysis to detect sick chicken or dead chicken. With reference to FIG. 4, the robot 3 can have an extended structure at the front for moving birds to one side or to nudge them and a similar extended structure at the back which can include a connection to a docking station. The robot 3 can nudge a chicken 30 and identify gait type GS=5 if bird does not move but thermographic camera image indicates the bird is alive, the robot 3 can nudge a chicken and identify gait type GS=4 if bird does move only a short distance but thermographic camera image indicates the bird is alive and in either case mark them, e.g. with a paintball and warn/inform the farmer. The shape of robot 3 is preferably such that it is able to carry out a slalom course through the birds.

Use thermographic camera and image analysis to detect leaking water that can lead to foot pad lesions and increased ammonia production.

Use camera and image analysis to detect lameness.

Robot 3 reduces human interaction, less contamination from external deceases.

Use robot arm to take samples of wet litter or faeces, monitor food and water by taking samples, have samples tested, and/or use robot arm to collect dead broilers.

All operations which give farmer some assurance of birds being healthy and well-kept are also integrated:

Use cameras and other sensors to monitor lighting, temperature, humidity, airflow, carbon dioxide and ammonia concentration and, by means of a control system including ventilation and/or air conditioner adapt air ventilation, lighting to provide more comfort . . . and reassure the farmer.

Detecting aggressive chicken, paintball them and give alarm.

Use camera and image analysis to detect sick chicken or dead chicken. Healthy chicken flee naturally from moving objects, such as a robot 3, especially when the robot is emitting sound, light, etc. Sick broilers may not have the possibilities anymore to flee an approaching robot. The robot 3 can nudge a chicken and identify gait type GS=5 if bird does not move but thermographic camera image indicates the bird is alive, the robot 3 can nudge a chicken and identify gait type GS=4 if bird does move only a short distance but thermographic camera image indicates the bird is alive and in either case mark them, e.g. with a paintball and warn/inform farmer. Dead bird can be identified as GS-5 but temperature not normal.

Use thermographic camera and image analysis to detect leaking water that can lead to sick foot pad lesions and increased ammonia production.

Detecting lameness.

Robot 3 reduces human interaction, less introduction from external of disease.

Use robot arm to take food samples, take samples of litter and have samples analysed.

Unique alarm system on these parameters.

Indoor location based ceiling markers.

Automatic estimate growth and weight.

Less interactions in the broiler from the farmer, which will be much more healthy.

All operations which give a manager in vertically organized poultry farms some reassurances of bird welfare . . . .

Use cameras and other sensors to monitor lighting, temperature, humidity, and, by means of a control system including ventilation and/or air conditioner adapt air ventilation, lighting to provide more comfort . . . and assure the farmer.

Detecting aggressive chicken, paintball them and give alarm.

Use camera and image analysis to detect sick chicken or dead chicken, e.g. the robot 3 can nudge a chicken and identify gait type GS=5 if bird does not move but thermographic camera image indicates the bird is alive, the robot 3 can nudge a chicken and identify gait type GS=4 if bird does move only a short distance but thermographic camera image indicates the bird is alive and in either case mark them, e.g. with a paintball and warn/inform farmer. Dead bird can be identified as GS-5 but temperature not normal.

Use thermographic camera and image analysis to detect leaking water that can lead to sick foot pad lesions and increased ammonia production.

Detecting lameness.

Robot 3 reduces human interaction, less introduction from external of disease.

Use robot arm to take food samples, take samples of litter and have samples analysed.

Unique alarm system on these parameters.

Indoor location based ceiling markers.

Automatic estimate of growth and weight.

Less interactions in the broiler from the farmer, which will be much more healthy.

Use of a Thermographic Camera in a Poultry Shed

A variety of parameters can be measured or displayed by means of a thermographic camera as a contactless sensor.

Thermal images, or thermograms, are actually visual displays of the amount of infrared energy emitted, transmitted, and reflected by an object. The images of a thermal imaging camera are capable of being analysed by computer based methods to interpret that data and build an image.

Advantages of Thermography

It shows a visual picture so that temperatures over a large area can be compared It is capable of catching moving targets in real time It is able to find deteriorating, i.e. higher temperature components prior to their failure It can be used to measure or observe in areas inaccessible or hazardous with other methods It is a non-destructive test method It can be used to detect objects in dark areas It has some medical applications In a special environment as a poultry farming in a shed 10 for example, the contactless thermal imaging camera and/or sensors can be included in an automated self-cleaning surveillance device, e.g. robots 3.

A thermographic camera such as a Flickr E40 can be mounted on robot 3. Such a camera has selectable options to control the measurements by the camera, e.g. to automatically adjust the temperature range assigning a color scale for each temperature. These adjustments can be done by the on-board processing engine 27, for example.

Figure 6:
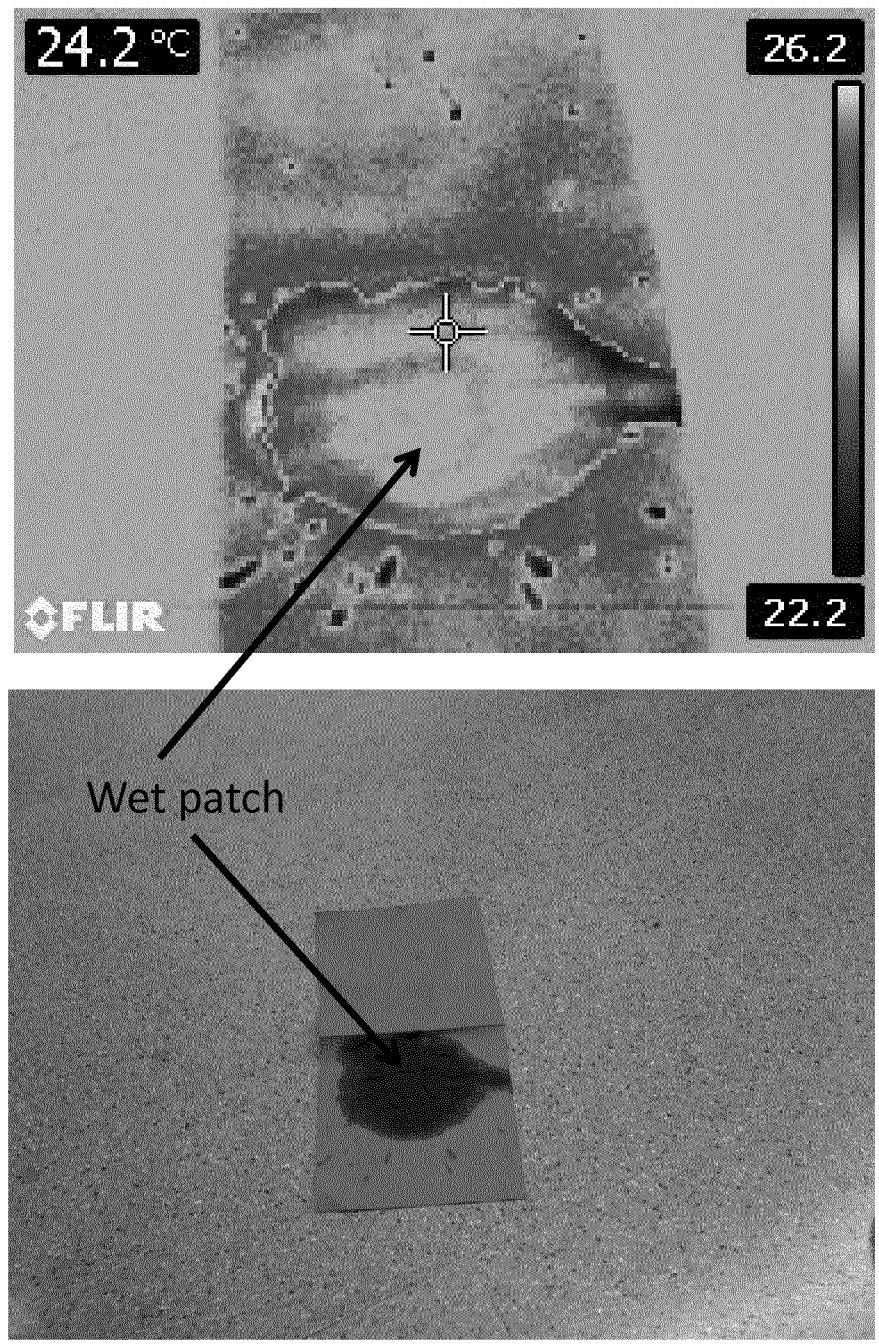
FIGS. 6 to 13 show thermographic images for use with embodiments of the present invention.

FIGS. 6 to 13 show examples of how a thermographic camera can be used to detect aspects of the welfare of broilers, whereby in each figure the image from the thermographic camera is shown at the top. The thermal imaging camera on robot 3 can be used to measure the humidity in the litter of poultry. As can be seen in FIG. 6, water on a napkin can be visualised. It can be clearly seen which part of the napkin is wet and which not, even the water temperature was nearly the same as ambient. One condition which is of importance is the presence of wet litter that not only represents a health hazard for the poultry but also generates ammonia.

Figure 7:
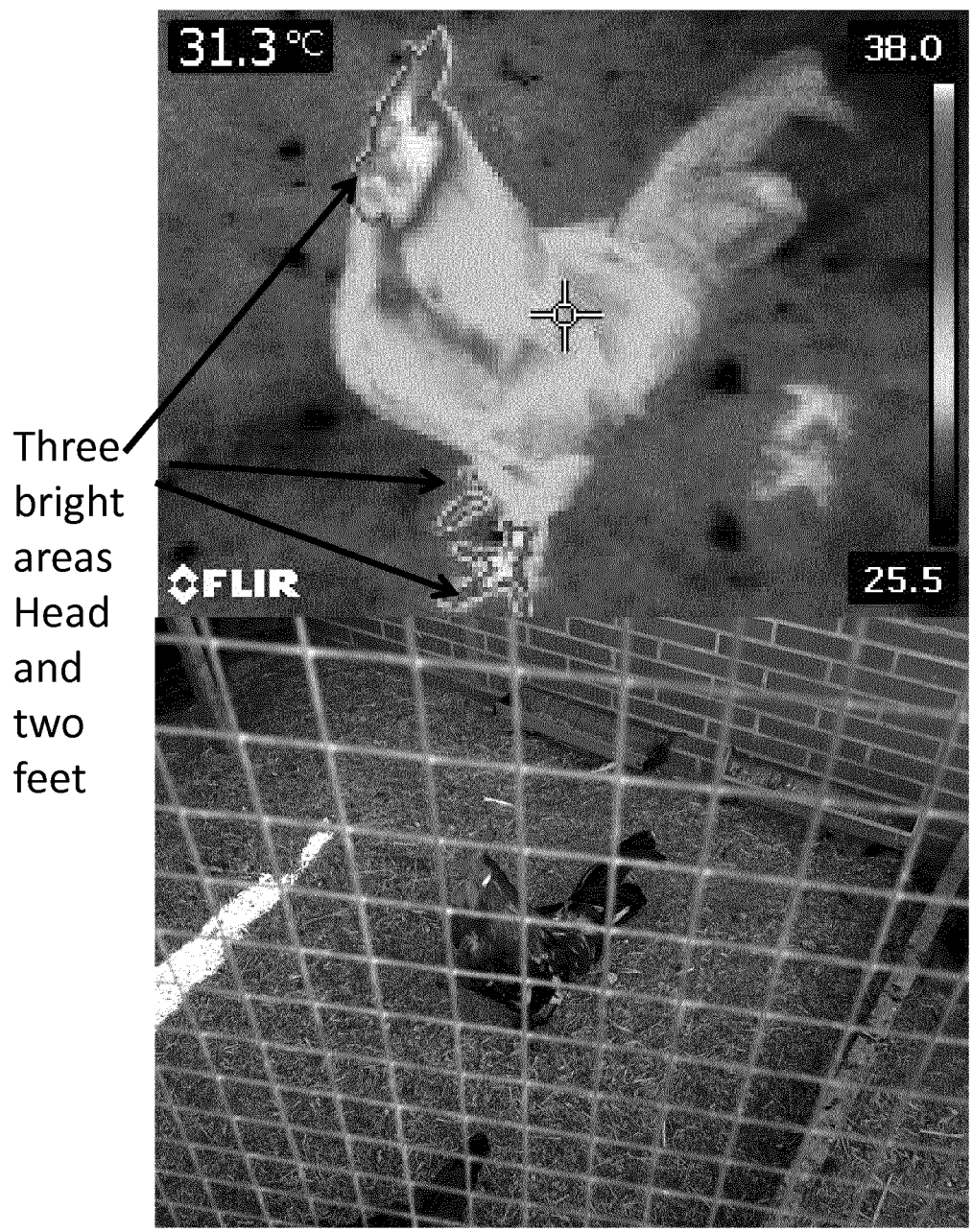

FIG. 7 shows that a chicken body can be detected as it has a temperature over 38° C. and that temperature variations in a chicken body can be measured. For example, legs and heads are hotter and the temperature of the parts covered by feathers is cooler. This provides a three-point distinctive signature for a chicken which can be used to identify individual chickens. The brighter zones can be extracted by thresholding and the arrangement of the three hots spots is a signature that can be recognised by image analysis.

Figure 8:

As shown in FIG. 8, the body of a chicken that was partially uncovered by removal of feathers has a new zone that is hotter than normal and this is detected by the camera. This can be used to visualise aggressive behaviour from the resulting in injury.

Figure 9:
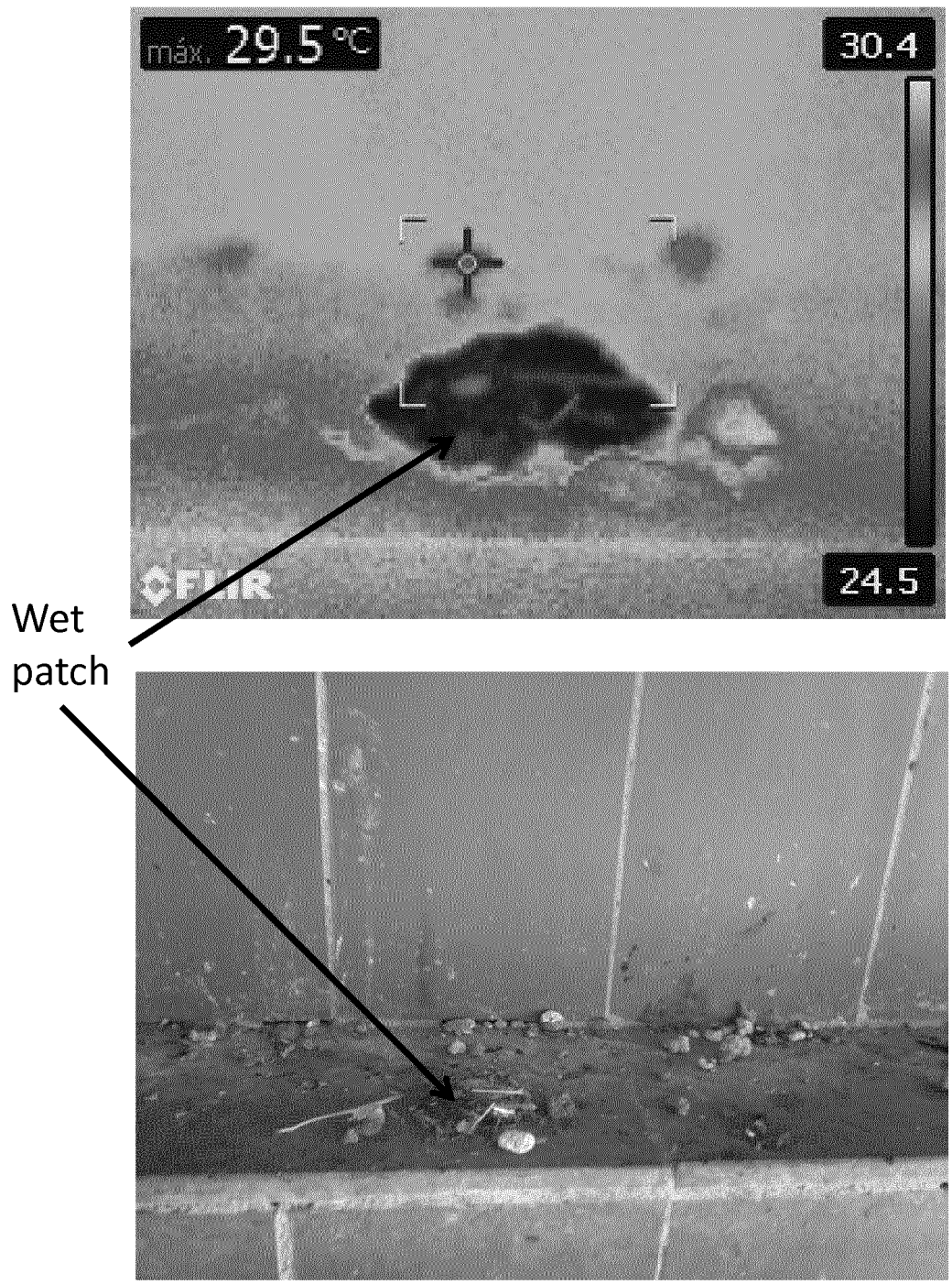
Figure 10:
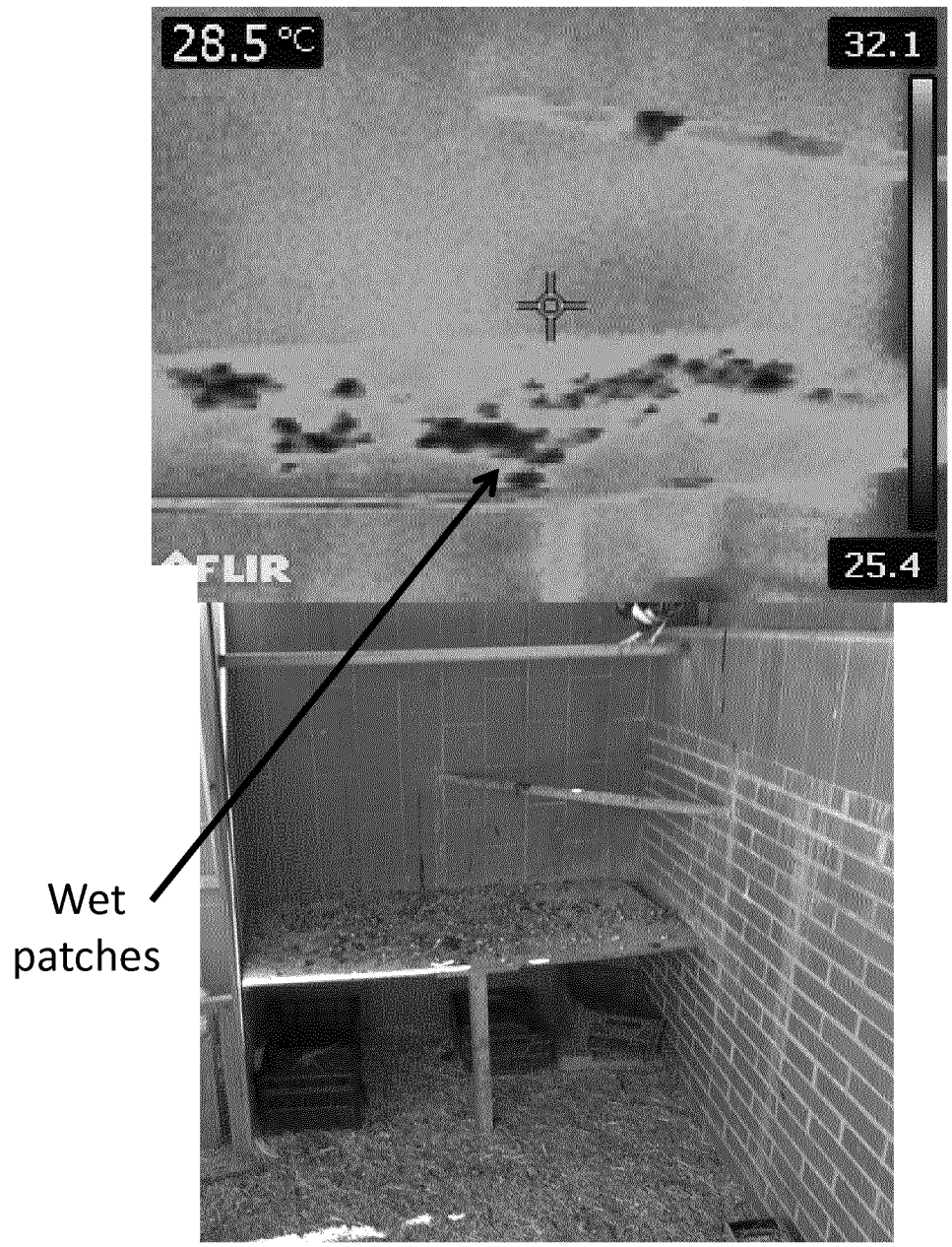

With the camera, the freshness of faeces can be detected as shown in FIG. 9 and also which ones are older than the others as shown in FIG. 10.

Figure 11:
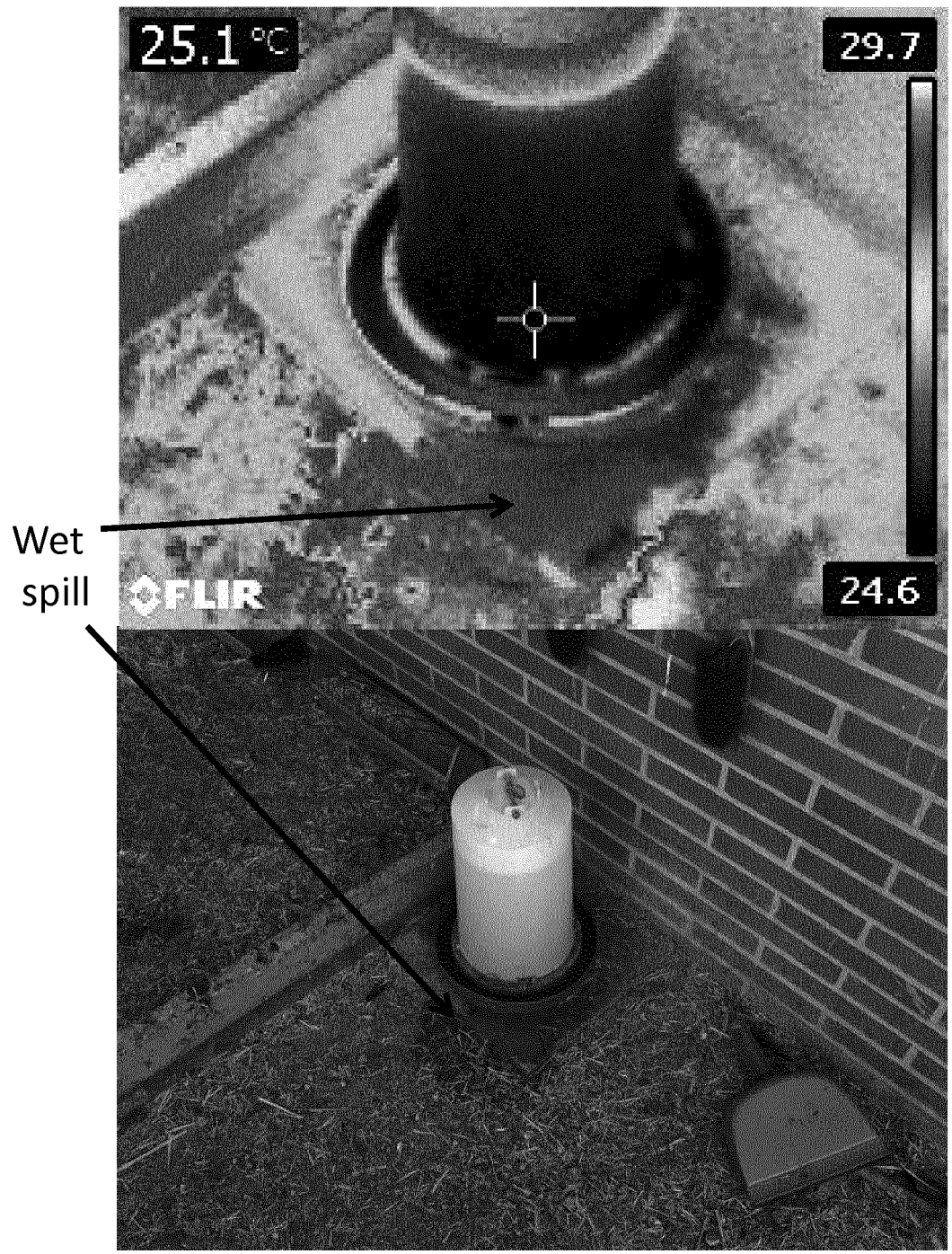
Figure 12:
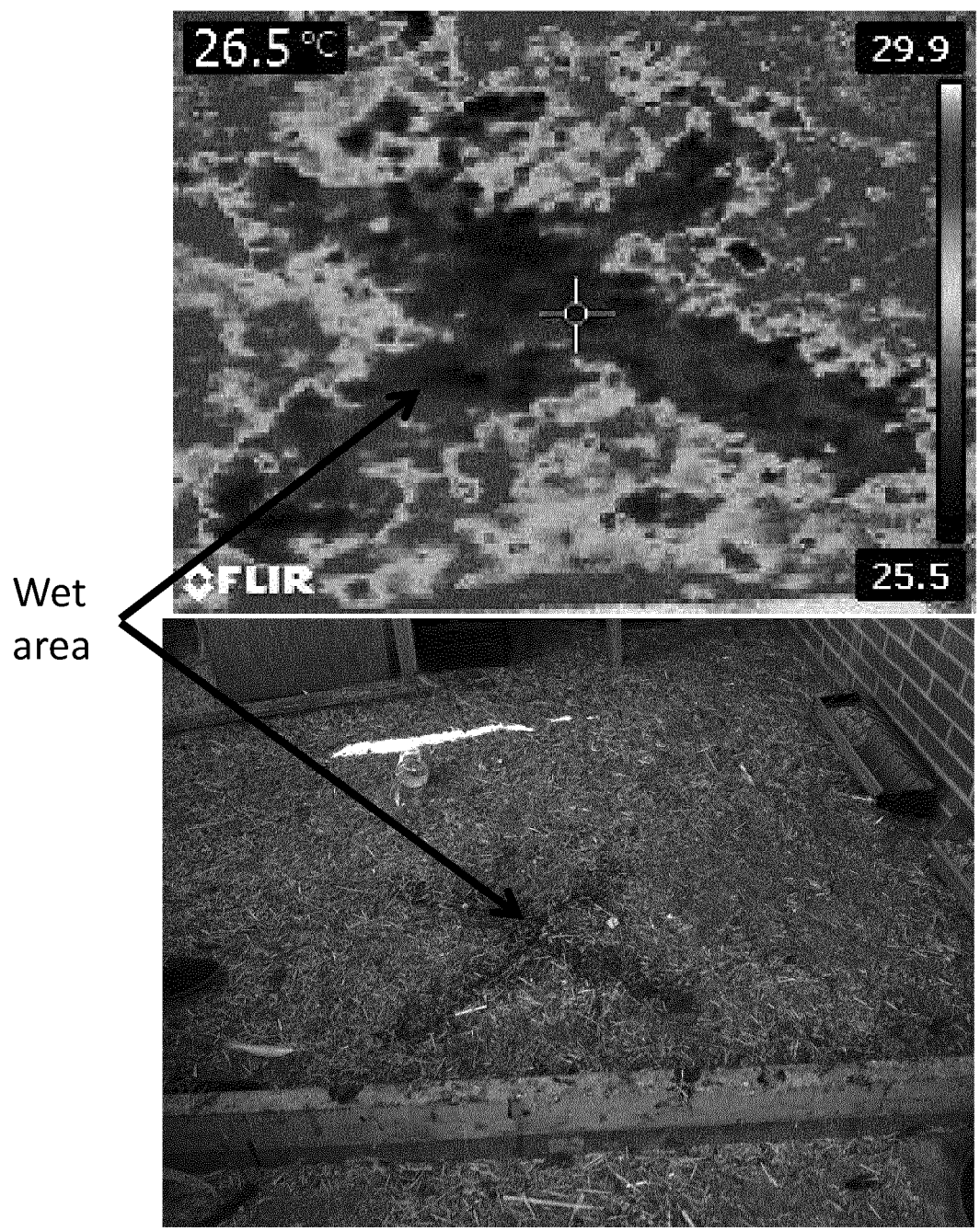
Figure 13:
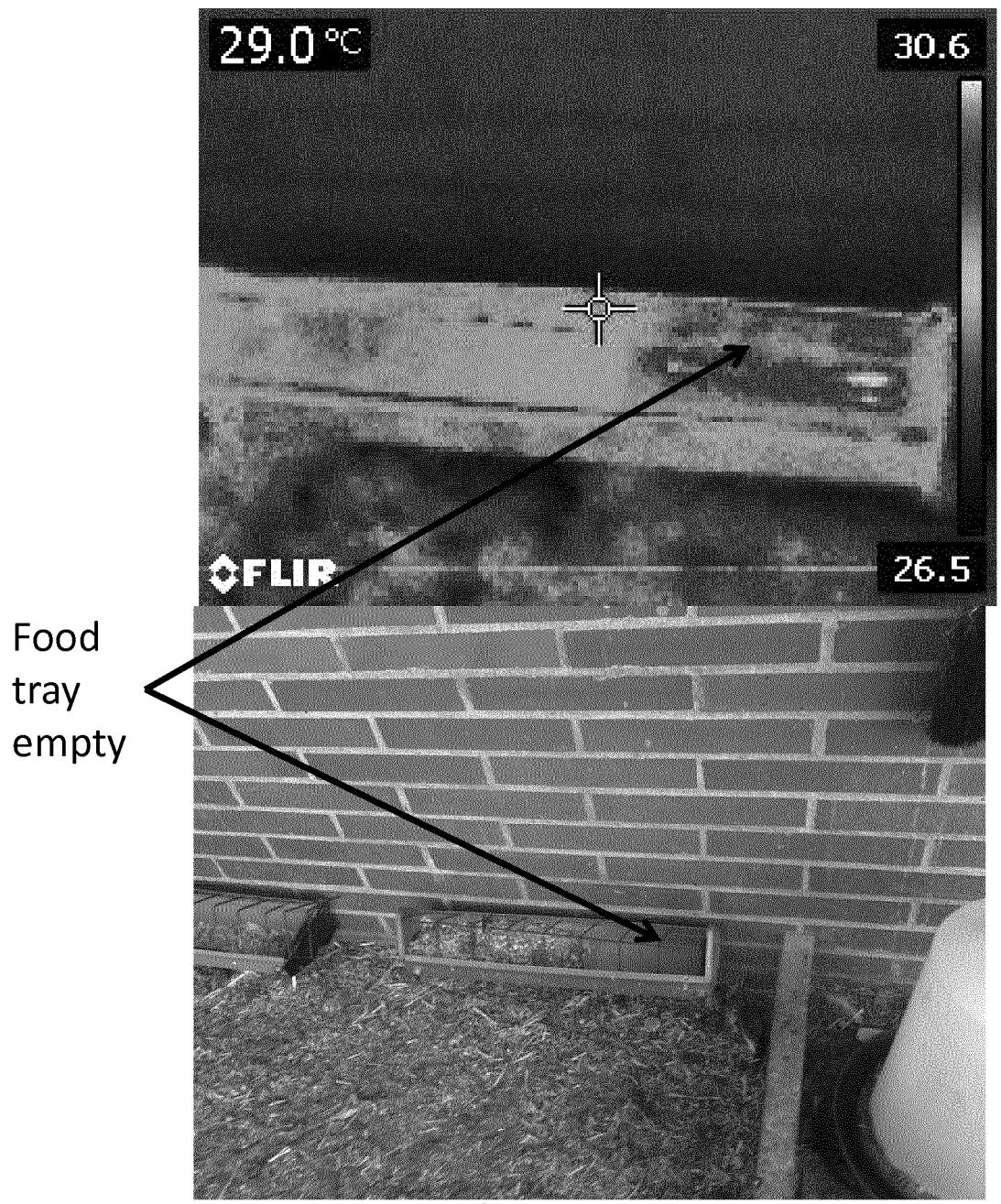

As shown in FIGS. 11 to 13 water leakages (FIG. 11), litter humidity (FIG. 12) and level of food (FIG. 13) can be visualised.

The robot 3 is provided to move through the shed.

According to certain embodiments described here above, said robot 3 can have a number of wheels, which allow to move through the shed 10, preferably by following a trajectory on the floor of the shed 10. Typically, the robot will move through the shed by travelling on the floor by use of its wheels.

According to alternative embodiments, said robot 3 can be adapted to move across the floor of the shed 10, while being operatively associated with a transport system 110, parts of which can be attached to the wall or the ceiling of the shed 10. According to such embodiments, the robot 3 can avoid making contact with the floor of the shed 10. Typically, the robot 3 will be hanging down from the transport system 110.

Figure 14:
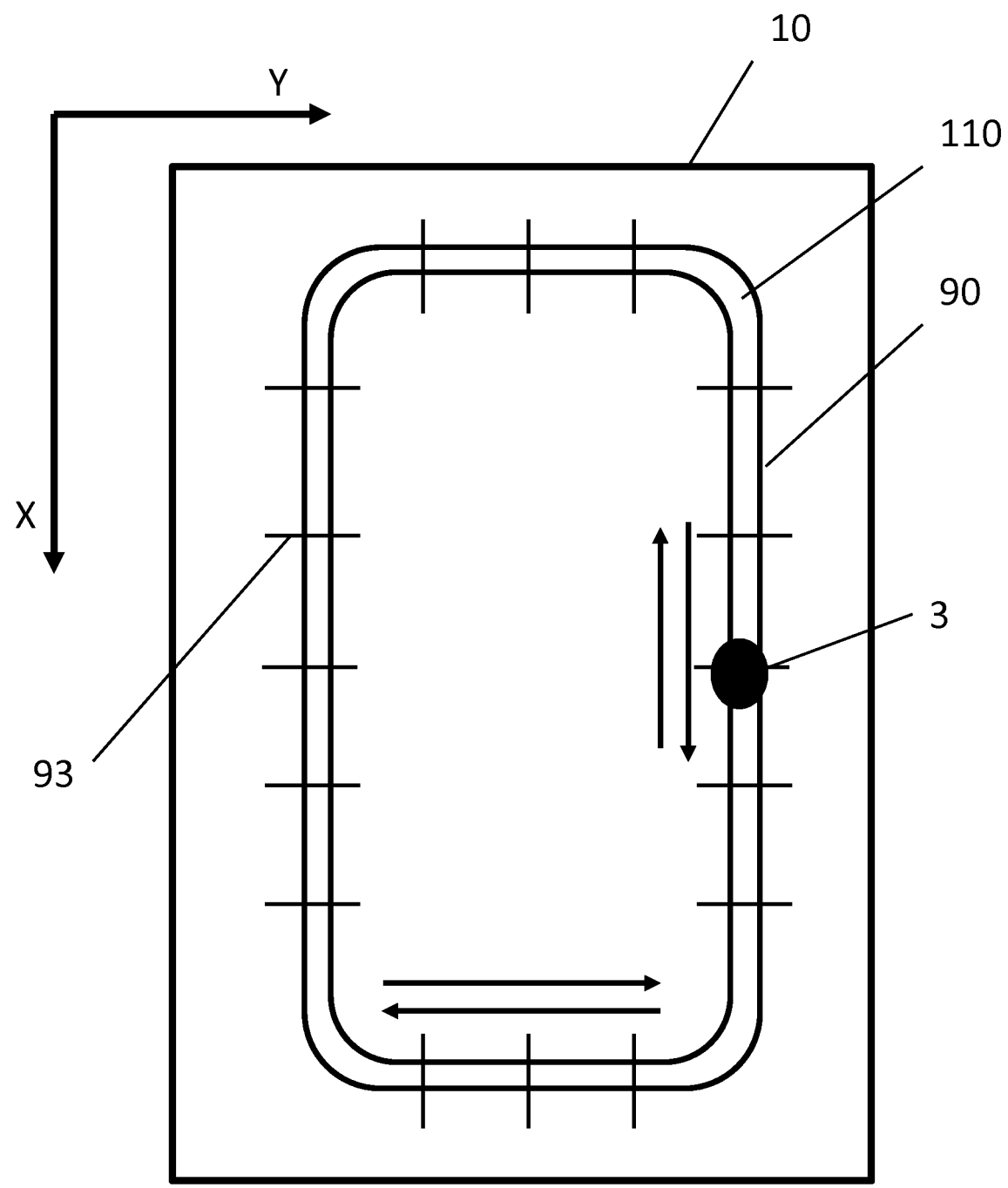
FIG. 14 shows a top view of a poultry shed according to an embodiment of the present invention.

A preferred embodiment of such a robot that hangs down from a transport system 110 is shown in FIG. 14.

FIG. 14 shows a shed 10 and a transport system 110. The transport system 110 comprises a closed circuit or closed frame of rails 90.

The closed circuit 90 is typically connected to the ceiling of the shed 10, in such a way that it advantageously allows the robot 3 to reach every part of the shed area. The closed circuit 90 can have any shape. Preferably, the closed circuit 90 has a rectangular form with rounded corners in order to facilitate passage by the robot 3. Alternatively, the closed circuit 90 can have a spiral shape, an elliptical shape or a circular shape.

The closed circuit 90 is preferably connected to the ceiling of the shed by using a plurality of cables. The cables can be spread through the area of the ceiling. Connecting the closed circuit 90 to the ceiling of the shed 10 has the advantage that oscillatory movement of the circuit is reduced to a minimum. Preferably, every connection point between the closed circuit 90 and the ceiling uses at least two cables to obtain minimum oscillatory movement.

It is an advantage of this embodiment that a closed circuit 90 can be connected to sheds of different configuration.

Alternatively, the closed circuit is connected to the wall of the shed, inclosing the shed area.

The robot 3 is operatively connected to the closed circuit 90 of the transport system 110, preferably via a set of wheels. This set of wheels are used by the robot 3 for moving along the closed circuit 90.

Figure 15:
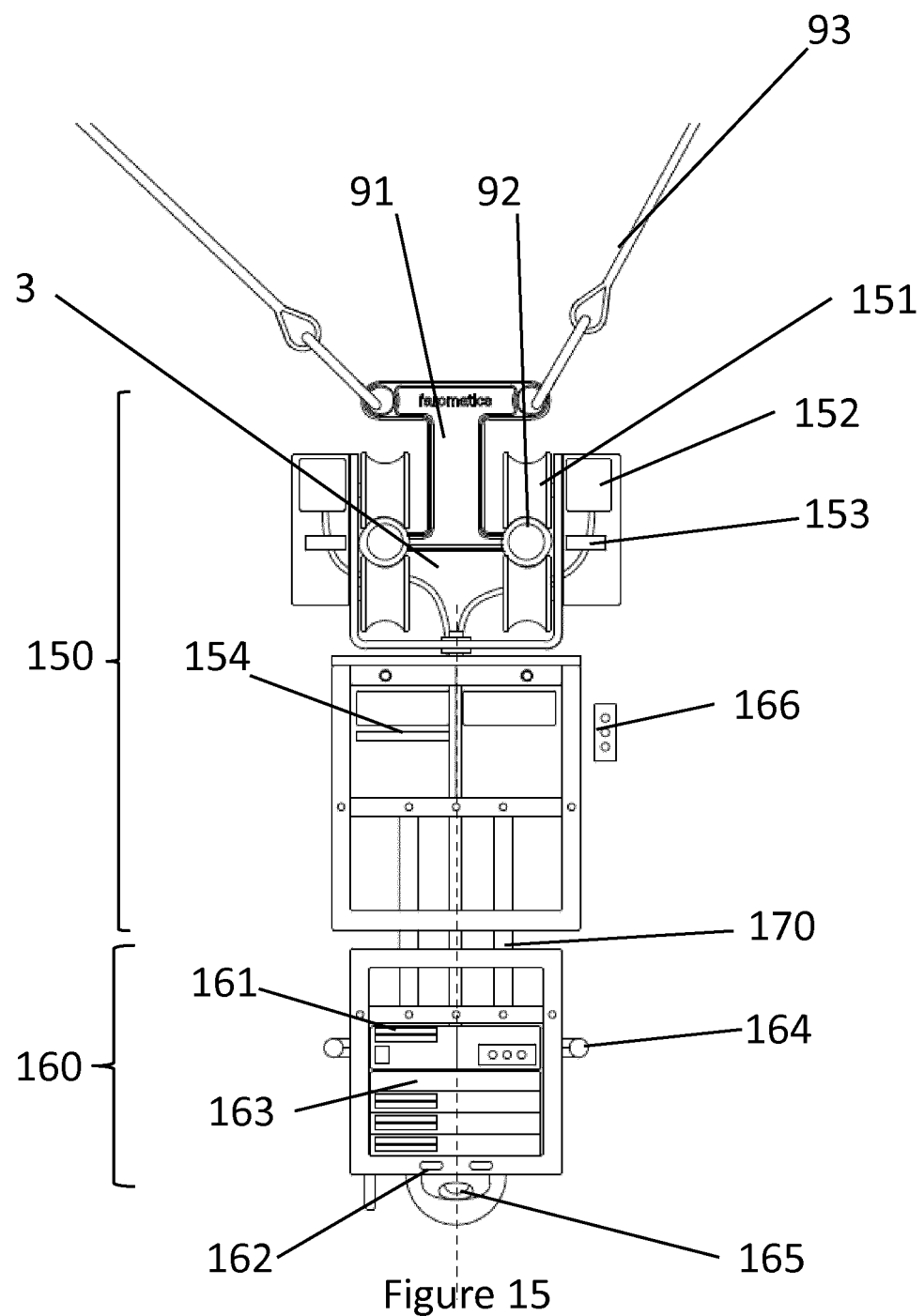
FIG. 15 shows a side view of a robot according to an embodiment of the present invention.

An embodiment of robot 3 is shown in FIG. 15. Robot 3 is provided with a first part 150, being the part that is operatively connected to the closed circuit 90. The first part 150 of the robot 3 typically comprises a set of wheels or any other connection means 151 for connecting with the transport system 110. The closed circuit 90 of the transport system 110 as shown in FIG. 15 is shown here as a T-shaped element 91 having rails 92, connected by cables 93 to the ceiling of the shed (not shown on the figure). The first part 150 further typically comprises electric motors 152 and hall sensors 153 for detecting magnetic markers on the walls of the shed 10. The robot 3 can further be provided with at least one Arduino microcontroller 154.

Robot 3 is further provided with a second part 160, that is operatively connected to the first part by use of a lowering system 170, that is arranged for lowering said second part 160 of the robot 3 to the ground level of the floor.

Systems for lowering devices to the ground level of a floor are known in the state of the art. Such systems include scissor lifts, cable lifts, spiral lifts, zip masts and telescopic systems.

For the purpose of the invention, the term "scissor lift" refers to a system that can raise or lower a device by the closing or opening of crossed supports pivoted like the two halves of a pair of scissors. The term "spiral lift" refers to a system that uses a spiral-shaped tube, mounted on a rotating axle powered by an engine. The term "cable lift" refers to a system that can raise or lower a device by the altering the length of the cable, typically through winding and unwinding of said cable on a reel. The term "zip mast" refers to a system that can raise or lower a device by stitching or zipping a plurality of metal strips, driven by a plurality of motors The second part 160 of robot 3 is typically provided with at least one microprocessor 161, such as a Raspberry Pi 3, as well as sensors 162 for measuring temperature, humidity, luminosity, concentration of carbon dioxide and/or ammonia, dust and/or air flow. For this purpose, extension slots 163 are provided. Furthermore, at least one microphone 164 for recording sound and at least one speaker (not shown in the figure) are provided.

The robot 3 is further provided with a plurality of cameras 165. Said plurality of cameras 165 have the purpose of monitoring the welfare of livestock in a shed and/or have the purpose of localising the robot in the shed, as explained elsewhere in the text.

The robot 3 can further be provided with LEDs 166 that allow external diagnosis of the robot's functioning by trained staff.

Figure 16:
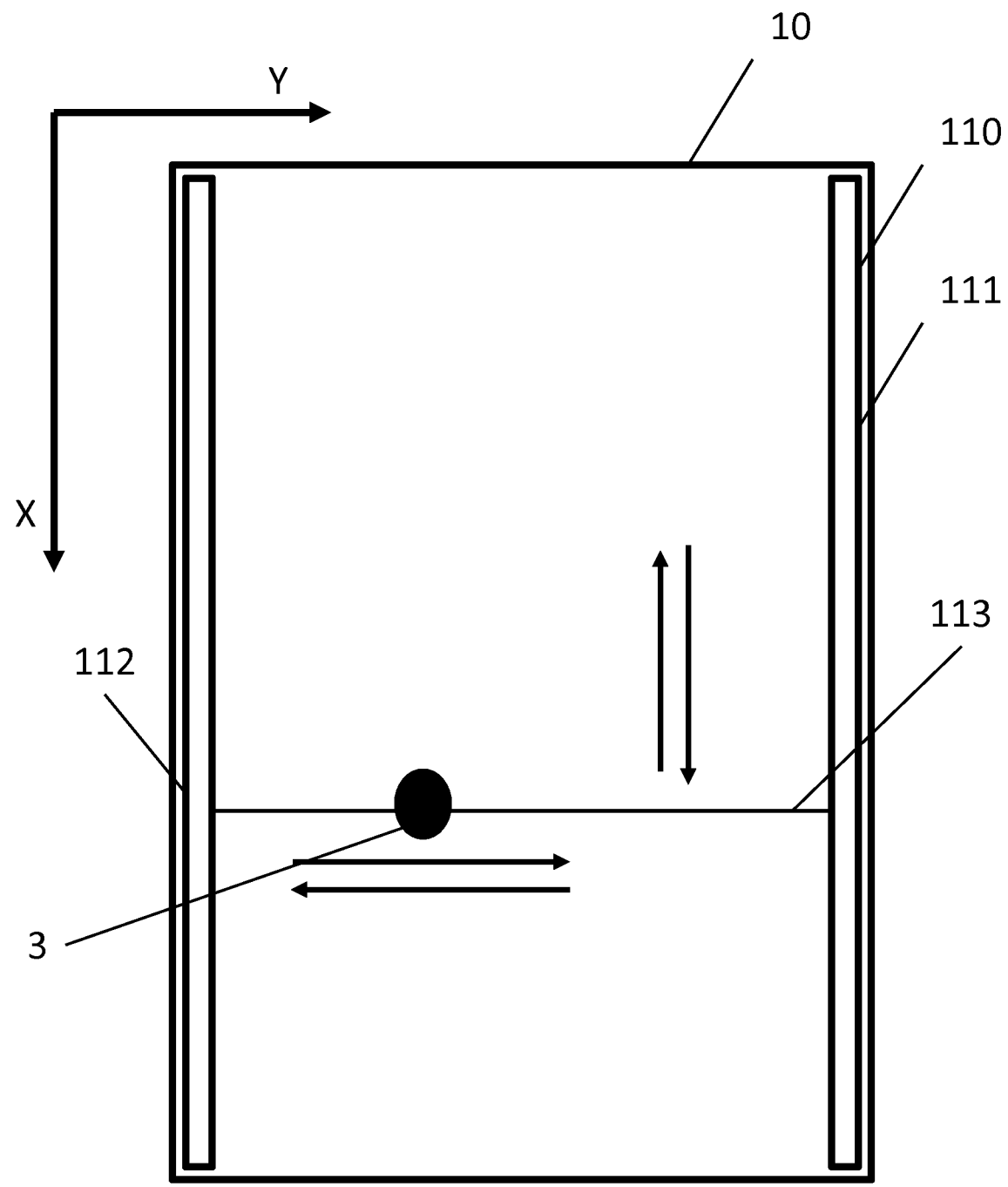
FIG. 16 shows a top view of a poultry shed according to an embodiment of the present invention.

An alternative embodiment of the transport system 110 is shown in FIG. 16. FIG. 16 shows a shed 10 and a transport system 110. The transport system 110 typically comprises a set of rails 111,112 that is attached to opposing walls of the shed 10. Preferably, the rails 111,112 are attached to those opposing walls that extend farthest in the shed 10 (in FIG. 16, the rails 111,112 are attached to walls along the X-axis). The transport system 110 according to this alternative embodiment further comprises crossing means 113, which are at its ends operatively connected with the set of rails 111,112. Said crossing means 113 can be a bar or beam, made of any suitable rigid, light-weight material. Preferably, said crossing means 113 comprise a cable.

According to certain embodiments, the crossing means 113 move along the set of rails 111,112, wherein the crossing means 113 remain parallel with a pair of opposing walls. In FIG. 16, the crossing means 113 move parallel to the Y-axis. As these walls are typically the shortest walls in the shed, a high degree of stability can be provided for the moving robot 3. It is advantageous that the moving robot 3 does not start to oscillate, as objects that are moving abruptly or that are swinging in the air can frighten nearby animals. In particular broilers will demonstrate a panic reaction when they spot a moving object above them, as they associate this with the presence of birds of prey.

Alternatively, when the crossing means 113 comprise a cable, the crossing means 113 can form an angle with the opposing walls to which the set of rails 111,112 are attached, which angle is different from 90°. In order to vary the length of the cable, the set of rails 111,112 are arranged with a reel or bobbin for winding and unwinding the cable.

The crossing means 113 allow the robot 3 to traverse the shed space in a direction different than the direction of the set of rails 111,112. According to FIG. 16, the robot 3 can move along the crossing means 113 in a direction that is orthogonal to the direction in which the crossing means 113 move. When said crossing means 113 comprise a bar or beam, the robot 3 can move over said beam via a rail system. When said crossing means 113 comprise a cable, the robot 3 can move along the direction of the cable, by winding and unwinding on two reels that are at the respective ends of the cable.

When rigid crossing means 113 such as a beam or bar are used, the second part 160 of the robot 3 is lowered by use of said lowering systems 170.

When the crossing means 113 comprise a cable, then the robot 3 can be lowered by unwinding the cable, which is wound up on a reel.

Alternatively, the second part of the robot 3 can be lowered by the combined use of cables with a varying length and a lowering system 170 as described here above.

The embodiments of the transport systems described here above allow the robot 3 to move across the room in X- and Y-direction. The lowering system 170 allows the second part 160 of the robot to move along the Z-direction. The robot 3 can therefore move through the shed 10 and approach every individual animal without having to touch the ground.

Figure 17:
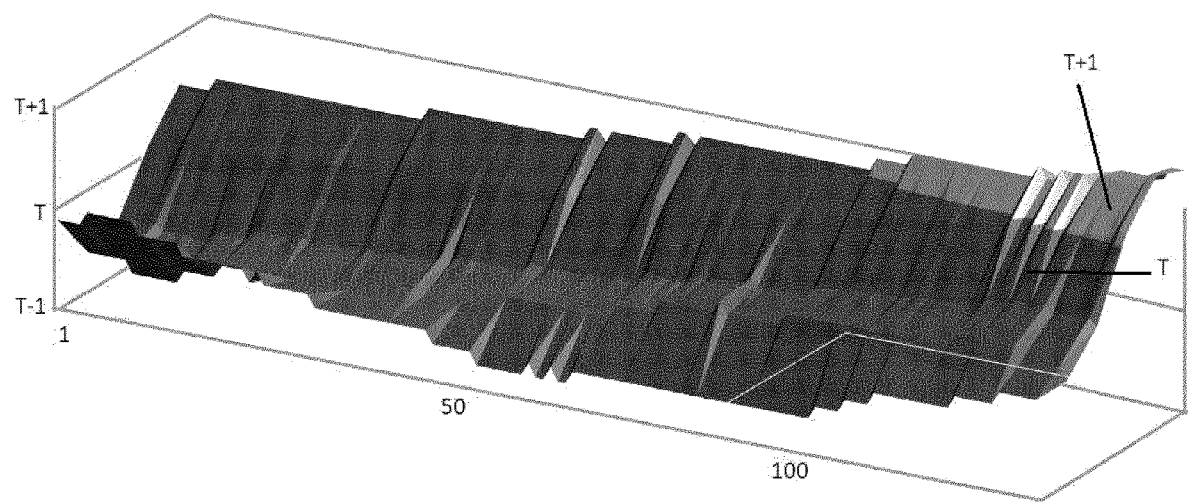
FIG. 17 shows a temperature map of a poultry shed.

According to certain embodiments of the invention, the system, preferably the processing engine, is configured to map ambient conditions over the whole area of the shed. One condition which is of importance is the presence of wet litter that not only represents a health hazard for the poultry but also generates ammonia. Typically, the robot 3 moves through the shed 10 following a trajectory route, while continuously or repetitively, meaning at given moments, taking measurements. Said trajectory route can be based on a pre-stored route. Alternatively, the robot 3 moves randomly. When measurements have been taken over the whole or significant part of the shed area, the system can create a map wherein spatial variation of one of the observed parameters is shown. As a non-limiting example, FIG. 17 shows a map of temperature variations in a poultry shed. The temperature in an area of the shed can vary in such a way from the overall temperature that the animals do not feel comfortable anymore in that particular area.

The inventors have found that continuous measurements of ambient conditions in the total area of the shed, followed by mapping parameters such as temperature, concentration of carbon dioxide and/or ammonia, air flow, humidity, luminosity and dust, allow for a better overall picture of living conditions in the shed. It has been found that a limited number of static sensors spread across the shed 10 may hide parameter deviations such as the ones shown in FIG. 17. The system can then further be configured to report a parameter that locally exceeds a certain value. The system can also be configured to intervene; e.g. an excessive temperature can be counteracted by increasing air flow locally. One condition which is of importance is the presence of wet litter that not only represents a health hazard for the poultry but also generates ammonia.

The system can also be configured to link locally exceeding parameters with animal concentration in that part of the shed.

According to advantageous embodiments of the invention, the robot is provided with at least two cameras, suitable for the monitoring of the welfare of the livestock, wherein at least one camera is a thermal camera. At least one other camera is a video camera.

Figure 18:
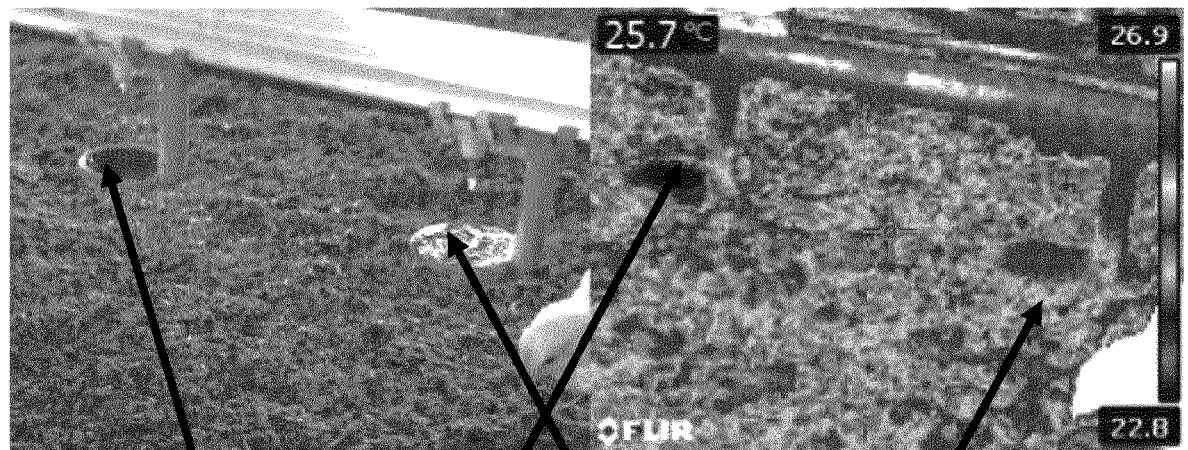
FIGS. 18 and 19 show thermographic images for use with embodiments of the present invention.

It is an advantage of the invention that said at least two cameras can provide for a plurality of coupled images. Preferably, said plurality of coupled images involves images that are taken by said at least two cameras at substantially the same moment, showing substantially the same objects. The plurality of coupled images can be used for the detection of dead or sick broilers. It is a further advantage that said plurality of coupled images can be used for detecting malfunctioning equipment, which can influence the welfare of the livestock. In case of a malfunctioning drinker, as shown in FIG. 18, the broilers would not only have a drinking opportunity less, a water leak at the origin of the malfunctioning drinker could also result in wet litter, which can cause illness, an ammonia generation as described here above. By being able to identify wet litter at any position of the poultry shed, a warning can be given of ammonia generation even before the ammonia has been detected.

A further advantage is that the plurality of coupled images can be used to detect animal droppings (litter). Analysis by the system of droppings allow to evaluate the health level of the animals' overall digestive system. The system uses for this purpose a digestion quality index, which allows to split up the detected and analysed droppings on the basis of predetermined parameters. E.g., the presence of blood or of undigested food in the droppings serve as an indication of possible illness. According to certain embodiments, the system can divide the analysed droppings in at least two categories. At least one category will alert the system to take measures for reducing the risk of possible disease spreading. These measures can include isolating the affected animal, in case the robot 3 has detected the individual animal. This is feasible when e.g. a limited amount of cattle is observed in a shed. For a larger number of animals in a shed, as is typically the case with broilers, countermeasures may include administering medicine to the whole animal population by use of e.g. the drinking water.

Preferably, the robot has two cameras, one camera being a video camera and a second camera being a thermal camera. Typically, both cameras will each take a photo at substantially the same instant of substantially the same scene. The photos are then coupled. Objects of interest are detected an object detector module, which is part of the software run by the processing engine of the system. The object detector module is trained to detect chickens, equipment and/or droppings. The module will compare the photo taken by the video camera with the one taken by the thermal camera. Typically, the module will segment the photo taken by video camera. The module will then look for hot spots in the thermal image and compare said hot spots with the segmented photo. If the module decides that both photos display the same objects (e.g. both photos display a chicken), then the objects in the photo will be classified in a suitable category (e.g. "chicken", "equipment", "dropping", "wet litter").

Figure 19:
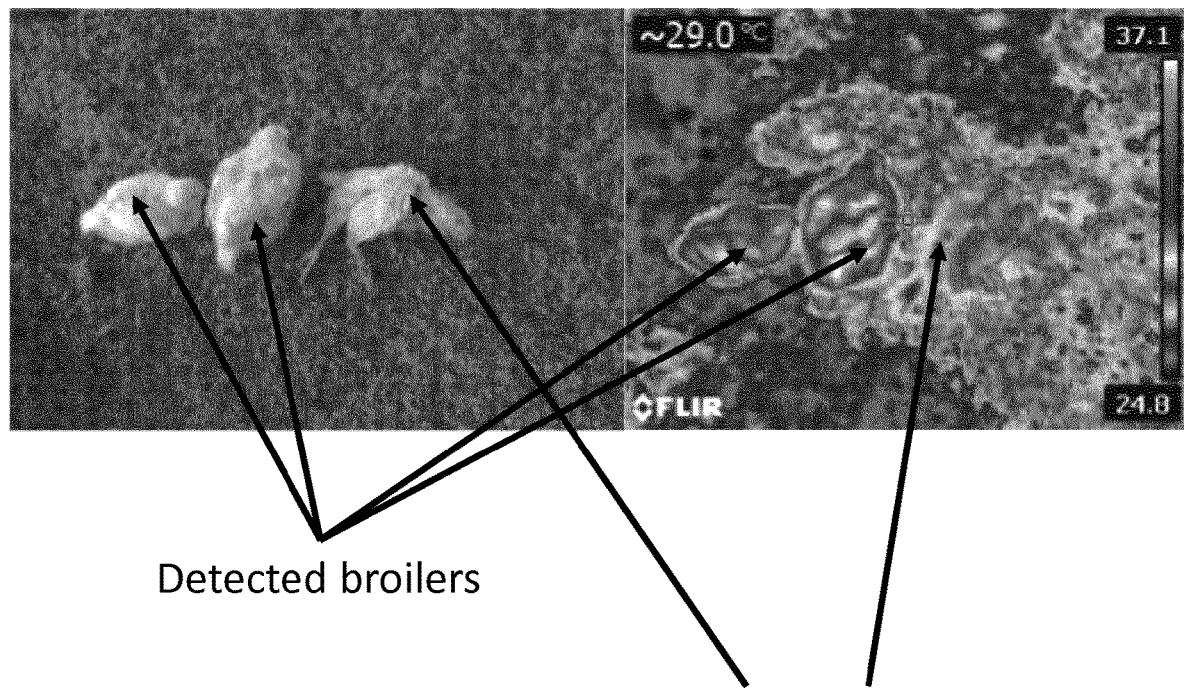

FIG. 19 shows an example of a case where the object detector module will not find an agreement regarding the nature of the objects on the two photos. The module will find a total of three broilers in the image recorded by the video camera on the left. However, when analysing the thermal photo on the right, only two broilers are found, as the body temperature of the third dead broiler has fallen to ambient temperature. The object detector module of the system detects this anomaly and can act subsequently by e.g. alarming trained staff.

Preferably, the object detection module uses a three-point detection method or three-point test to detect a chicken in a thermal photo. Said test is based on the fact that the legs and the head of chickens have a higher temperature than the other body parts of the bird. The inventors have now found that these three points—the two legs and the head—can be advantageously used for chicken detection in a thermal photo.

Having an indication of the broiler's body temperature can be used for detecting changes in the livestock's welfare. As an example, it will be appreciated that a feverish broiler, having an unusual high body temperature, can be quickly detected by the system. A broiler having lost part of its plumage due to aggressive behaviour, can also be detected due to the abrupt temperature differences in parts of the body.

According to a preferred embodiment of the present invention, the robot is further provided with a device for marking an individual broiler. Said marking device preferably uses a colour mark for marking individual animals, such as a paint mark. When a sick broiler has been detected by the robot, e.g. a broiler having a gait type GS:4 or GS=5, the marking device can be used to mark the affected broiler. Advantageously, it has been found that birds, even when confined in the limited space of a poultry shed, tend to stay in a certain area of the shed. This allows an intervening person to spot the marked bird quickly.

Without any contact with the animals, thermography allows determination of aspects of a healthy environment and conditions as well as the opportunity to detect failures such as a water leakages or sick animals. The robot system of the present invention can act early to minimize negative impacts especially when using image analysis and images from different types of camera.

The technical effects and advantages of embodiments of the present invention can be to execute a computer program product on a processing engine and the system according to the present invention correspond mutatis mutandis to those of the corresponding embodiments of the system according to the invention. A non-transient signal storage medium can be used for storing the computer program product, e.g. an optical disk (CDROM or DVD ROM) a magnetic tape, a hard disk, a solid state memory such as flash memory or similar.

The invention claimed is:

1. A system for monitoring the welfare of livestock in a shed comprising poultry, said system comprising:
 a plurality of sensors for measuring ambient conditions in the shed;
 a robot, that moves through the shed, said robot comprising at least two cameras, one of which is a thermal camera and one of which is an optical camera;
 a processing engine and a memory operatively associated with the processing engine, the processing engine being operatively associated with the robot and the plurality of sensors for receiving data recorded by the robot and the plurality of sensors, said recorded data comprising measurements of ambient conditions in the shed; images from said at least two cameras,
 wherein said at least two cameras are configured to provide a plurality of coupled images that are recorded at the same time from the thermal camera and the optical camera of a same object,
 wherein said processing engine is configured to analyze said plurality of coupled images that are recorded at the same time from the thermal camera and the optical camera for at least detecting animals and animal droppings by:
 detecting individual poultry animals,
 distinguishing the individual poultry animals as being healthy poultry animals from sick and/or dead poultry animals,
 detecting of animal droppings of the individual poultry animals, and
 dividing the detected animal droppings of the individual poultry animals in at least two categories, at least one category being arranged for alerting the system user.

2. The system according to claim 1, wherein said plurality of sensors is part of said robot.

3. The system according to claim 1, wherein said processing engine is further adapted to analyze said plurality of coupled images for the detection of wet litter and/or equipment.

4. The system according to claim 3, wherein said analysis comprises detection of the individual poultry animal by detection of at least the head and the two legs of the individual animal.

5. The system according to claim 1, wherein configuration of said processing engine further includes mapping measurements of ambient conditions over the whole or part of the shed area.

6. The system according to claim 1, wherein said measurements of ambient conditions include temperature, humidity, carbon dioxide and ammonia concentration, airflow and/or luminosity of the shed and/or sound registration in the shed.

7. The system according to claim 1, wherein said robot is further provided with a device for marking an individual animal, said marking being a marking with paint.

8. The system according to claim 1, wherein the analyzing of the animal droppings includes detecting for abnormalities.

9. The system according to claim 1, wherein the robot is further configured to interact with the poultry by emitting at least one of sound or light.

10. The system according to claim 1, wherein the analyzing of both the plurality of coupled images and the animal droppings are used to distinguish the individual poultry animals as being the healthy poultry animals or the sick poultry animals.

11. A robot for use in a system for monitoring the welfare of poultry for intensive meat production in a shed, the robot comprising at least two cameras for providing a plurality of coupled images, one camera being a thermal camera and one of which is an optical camera, said robot being operatively coupled to a processing engine for analyzing said plurality of coupled images for detecting individual poultry animals and animal droppings,
 wherein the robot moves through the shed;
 wherein the plurality coupled images at least include a thermal image and an optical image that are recorded at the same time from the thermal camera and the optical camera of a same object,
 wherein the robot is configured to analyze said plurality of coupled images that are recorded at the same time from the thermal camera and the optical camera by:
 detecting individual poultry animals,
 distinguishing the individual poultry animals as being healthy poultry animals from sick and/or dead poultry animals,
 detecting of animal droppings of the individual poultry animals, and
 dividing the detected animal droppings of the individual poultry animals in at least two categories, at least one category being arranged for alerting the system user.

12. The robot according to claim 11, wherein the movement of said robot is selected from travel over the floor and wherein said robot has a number of wheels, each wheel being driven by a motor dedicated to that wheel, and each wheel having a traction surface coated with a non-sticky material or the wheel being made of a non-stick material, and operative association with a transport system having a set of rails, attached to the walls and/or ceiling of the shed, allowing the robot to move through the shed.

13. The robot according to claim 12, wherein said transport system comprises crossing means, which are at the ends of said crossing means operatively connected with said set of rails.

14. The robot according to claim 13, wherein said crossing means is selected from a bar, and a cable.

15. The robot according to claim 13, wherein said robot has a first part operatively connected to said crossing means, and a second part, operatively connected to said first part by use of a lowering system, for lowering said second part of said robot to ground level or any intermediate level.

16. The robot according to claim 15, wherein said lowering system comprises any one selected from the group consisting of a scissor lift, a cable lift, a spiral lift, a zip mast or a telescopic lift and combinations thereof.

17. A method for monitoring the welfare of poultry in a shed by use of a robot, that is adapted for traversing the shed, said robot having at least two cameras for providing a plurality of coupled images, one camera being a thermal camera and one of which is an optical camera, the method comprising:
 moving the robot through the shed;
 measuring ambient conditions in the shed by use of a plurality of sensors, capturing a plurality of coupled images by use of said at least two cameras, wherein the plurality of coupled images comprises at least a thermal image and an optical image that are recorded at the same time from the thermal camera and the optical camera of a same object, analyzing said plurality of coupled images by a processing engine that is operatively associated with the robot for the presence of animals and animal droppings, wherein said analyzing comprises detecting individual poultry animals, distinguishing the individual poultry animals as being healthy poultry animals from sick and/or dead poultry animals, detecting of animal droppings of the individual poultry animals, and dividing the detected animal droppings of the individual poultry animals in at least two categories, and producing a warning signal to alert a system user based on at least one category from the at least two categories, said at least one category being based upon the detection of sick or dead animals, abnormalities in the droppings, or ambient conditions that are inconvenient with predetermined values.

18. The method of claim 17, wherein capturing coupled images with said at least two cameras, one image being a thermal image, and wherein said processing engine analyzes said plurality of coupled images for the detection of wet litter and/or equipment.

19. The method according to claim 18, wherein the analyzing involves detection of an individual animal by detection of at least the head and the two legs of the individual animal.

20. The method according to claim 17, further comprising the measuring of ambient conditions includes temperature, humidity, carbon dioxide and ammonia concentration, airflow and/or luminosity of the shed and/or sound registration in the shed.

21. The method according to claim 17, wherein said processing engine is configured for mapping measurements of ambient conditions over the whole or part of the shed area.

22. A non-transitory computer readable medium storing a computer program product comprising code means, which when executed by a processor, is configured to cause a processing engine to perform the functions of the method steps of claim 17.

* * * * *